United States Patent
Maiorova

(10) Patent No.: US 8,615,143 B2
(45) Date of Patent: Dec. 24, 2013

(54) OPTICAL ARRANGEMENT FOR VARYING AN IMAGING RATIO OR OF A REFRACTIVE POWER

(75) Inventor: Tatiana Maiorova, Dmitrov (RU)

(73) Assignee: Future Optics GBR, Dusseldorf (DE)

( * ) Notice: Subject to any disclaimer, the term of this patent is extended or adjusted under 35 U.S.C. 154(b) by 0 days.

(21) Appl. No.: 13/166,522

(22) Filed: Jun. 22, 2011

(65) Prior Publication Data

US 2012/0007888 A1   Jan. 12, 2012

Related U.S. Application Data

(63) Continuation of application No. PCT/DE2009/050076, filed on Dec. 18, 2009.

(30) Foreign Application Priority Data

Dec. 22, 2008 (DE) .......................... 10 2008 064 512
Feb. 20, 2009 (DE) .......................... 20 2009 002 387

(51) Int. Cl.
G06K 9/32 (2006.01)
G02B 15/02 (2006.01)

(52) U.S. Cl.
USPC ........... 382/298; 359/672; 359/557; 359/683; 359/813; 359/555; 396/71; 396/73; 345/634

(58) Field of Classification Search
USPC .......... 359/672–685, 813, 555, 557; 382/298; 396/71, 73; 345/634
See application file for complete search history.

(56) References Cited

U.S. PATENT DOCUMENTS

| | | | |
|---|---|---|---|
| 696,788 A | | 4/1902 | Allen |
| 3,645,602 A | * | 2/1972 | Clave et al. .................. 359/421 |
| 5,835,263 A | | 11/1998 | Dobschal |
| 5,859,729 A | | 1/1999 | Misaka |
| 6,853,494 B2 | | 2/2005 | Sander et al. |
| 7,315,423 B2 | | 1/2008 | Sato |
| 7,411,739 B2 | * | 8/2008 | Obrebski et al. .............. 359/376 |

(Continued)

FOREIGN PATENT DOCUMENTS

| | | |
|---|---|---|
| DE | 1284177 | 11/1968 |
| DE | 2320626 A1 | 11/1973 |

(Continued)

OTHER PUBLICATIONS

Carl Zeiss, Design No. 000000-1152-354 "Augenuntersuchungen Mit Der Spaltlampe". (44 pages).

(Continued)

*Primary Examiner* — Evelyn A. Lester
(74) *Attorney, Agent, or Firm* — Osha Liang LLP

(57) ABSTRACT

Introduced is an optical arrangement for varying an imaging ratio and/or a refractive power including at least one optical axis, having at least two optical elements, which can be pivoted into and/or pivoted to and/or switched into and/or switched to the optical path, which encompass in each case a refractive power and an optical axis and the optical axes of which can in each case be made to be substantially congruent with the optical axis of the arrangement or are substantially congruent with the optical axis of the arrangement. The optical path between the optical elements, which can be pivoted into and/or pivoted to and/or switched into and/or switched to, undergoes at least one change in direction and/or vergence.

24 Claims, 15 Drawing Sheets

(56) References Cited

U.S. PATENT DOCUMENTS

| | | |
|---|---|---|
| 2004/0001186 A1 | 1/2004 | Yamamoto |
| 2005/0113912 A1 | 5/2005 | Feenstra et al. |
| 2006/0103920 A1 | 5/2006 | Jagemann |
| 2007/0146490 A1 | 6/2007 | Hendriks et al. |
| 2007/0177122 A1 | 8/2007 | Loopstra et al. |
| 2008/0247019 A1 | 10/2008 | Kuiper et al. |
| 2008/0316444 A1 | 12/2008 | Sorg et al. |
| 2009/0135395 A1 | 5/2009 | Melzer et al. |
| 2009/0207396 A1 | 8/2009 | Melzer et al. |

FOREIGN PATENT DOCUMENTS

| | | |
|---|---|---|
| DE | 2633965 A1 | 2/1978 |
| DE | 19525520 A1 | 1/1997 |
| DE | 10327551 A1 | 4/2004 |
| DE | 102004061901 A1 | 5/2006 |
| EP | 1672431 A1 | 6/2006 |
| EP | 1969995 A1 | 9/2008 |
| GB | 1318042 | 5/1973 |
| WO | 99/18456 A1 | 4/1999 |
| WO | 2005096029 A1 | 10/2005 |
| WO | 2007085290 A2 | 8/2007 |
| WO | 2008019860 A1 | 2/2008 |
| WO | 2010/072218 A1 | 7/2010 |

OTHER PUBLICATIONS

Blouke, Morley M., "Bifocal Liquid Lens Zoom Objective for Mobile Phone Applications", Proceedings of the SPIE, vol. 6501, pp. 650109, 2007 (9 pages).

International Search Report issued in PCT/DE2009/050076, mailed on Apr. 5, 2010, with English translation thereof (8 pages).

Publication Notice for European Application No. 1019758 (1 page).

* cited by examiner prior art

OPTICAL ARRANGEMENT FOR VARYING AN IMAGING RATIO OR OF A REFRACTIVE POWER

BACKGROUND OF INVENTION

1. Field of the Disclosure

The invention relates to an optical arrangement according to the preamble of claim 1.

2. Description of Related Art

Optical arrangements and devices for varying an imaging ratio or of a refractive power have been known for a long time. The varifocal lenses, for instance, have already been mentioned since the first half of the $19^{th}$ century in the Proceedings of the Royal Academy. Contrary thereto, an application for a patent for a first optical arrangement for continuously varying an imaging ratio with a stationary image was filed in 1902 (U.S. Pat. No. 696,788). An arrangement for varying an imaging ratio in discrete steps in the form of a drum comprising different pairs of optical elements by means of a refractive power also dates back at least to the first half of the $20^{th}$ century (e.g.: DE 1 284 117, in which the issue of further intermediate steps in response to the varying of an imaging ratio is broached).

Attempts to change refractive power also took place many years ago (GB 1 318 042 and DE 2 320 626) without having found their way into the commercial field.

During the last decades, much progress has been made in the correction of the optical errors in optical arrangements for continuously varying an imaging ratio, so that the optical quality is acceptable, at least within a small tuning range of such an imaging ratio. The cost-effectiveness of the arrangements was also improved by partly using the same components, see U.S. Pat. No. 6,853,494 B2. The handling of the varifocal lenses became easier by means of autofocus. Only the optical arrangements for varying an imaging ratio or a refractive power in discrete steps have hardly changed. For instance, it becomes clear from EP 1 969 995 A1 or from the brochure "Augenuntersuchungen mit der Spaltlampe" of the ophthalmologic instruments by Carl Zeiss, design number: 000000-1152-354 that nothing has happened here for more than the last 50 years, except for the correction of optical errors.

These arrangements furthermore remained substantially unhandy and dissatisfying as a whole. Even though an optical arrangement for varying an imaging ratio and/or a refractory power in discrete steps according to the state of the art (FIG. 1) can encompass a wide dynamic range in the imaging ratio (large ratio maximum to minimum imaging ratio), wherein optimal optical quality can remain virtually constant across the entire dynamic range. The development effort of such an arrangement is thereby rather low. However, there are many large disadvantages. Only few discrete imaging ratios are possible, no intermediate values. Due to the fact that the axis of rotation of the arrangement intersects the optical path, extensive mechanical solutions are necessary. This is one of the reasons why the arrangement is unreasonably large, voluminous, long, heavy and slow. Due to large levers, it has large moments in response to being moved (rotation of the arrangement) and has thus a high inertia and problems arise in response to the stabilizing in the end position. It uses a lot of energy when it is moved. The imaging ratio rarely meets exactly the demand of the user. Due to the high inertia and the large moments of the arrangement, the device, which includes the arrangement, must be embodied in a particularly robust and stable manner. The arrangement itself is thus not only very large, it additionally makes the device, which accommodates it, larger and heavier. Such an arrangement can mostly be used in the low-end microscopes and in other stationary optical viewing devices. Due to the size, the weight, the energy consumption and the slowness, a use in the consumer field, thus cellular phones with a camera, cameras, camcorders, etc., e.g., is thus impossible.

On the other hand, a common optical arrangement for continuously varying an imaging ratio provides for a continuous detuning by means of a translatory movement of one or a plurality of components and a rotary movement of the arrangement is not necessary. The disadvantages, however, are serious: optical characteristics, e.g. optical errors, change with the imaging ratio, a high development effort is necessary, many, partly moved lenses are required. It is difficult to adjust the arrangement, the control thereof is complicated. The movements of the lenses must be encoded, because they must occur in a highly non-linear manner. High demands are made on the moved mechanics. The arrangement is slow, in particular in response to large variations in the imaging ratio. It is heavy, has a high wear and hysteresis occurs in parts. Optical errors in response to a wider dynamic are not acceptable, high chromatic aberrations and distortions (image field curvature) occur. A further disadvantage is the weakness in terms of light, which is shaped by a higher minimum number of f-stops and by many additional surfaces. The energy consumption in response to a full utilization of the dynamics is also very high. When used in cameras, the parts, which are moved against the housing, make it possible for dust, other small particles and liquids to penetrate into the housing. Furthermore, the arrangement is expensive, which is caused by the high development costs as well as by the component and production costs. This arrangement has been used for decades in the consumer as well as in the professional field, but only more or less hesitantly. For the most part, the offer is only a bad compromise of price, quality and handling.

The recent attempts of setting up an optical arrangement for continuously varying an imaging ratio comprising a small dynamic range and without moved parts (Sensors, Cameras, and Systems for Scientific/Industrial Applications VIII. Edited by Blouke, Morley M., Proceedings of the SPIE, Volume 6501, pp. 650109 (2007)), by means of lenses having a variable refractive power, can be considered as having failed, on the one hand, but as being a starting point for other solutions, on the other hand. The attempt has failed, because an intrinsically continuous arrangement is operated only in a switching operation with only two positions (1.times. and 2.5.times.) due to the very high chromatic aberrations, and in addition comprising four lenses having a variable refractive power, where only two are actually needed on principle. The number of the different imaging ratios are not the way they are desired. The authors even propose to record the different colors subsequently, so as to manage the chromatic errors. This is not a good proposal for a microscope, a headset magnifying glass or another viewing device, with which images are not recorded by means of a camera chip, but are observed directly with the eye. Having a length of 29 mm, the arrangement is also not suitable for a cellular phone camera, e.g.

SUMMARY OF INVENTION

It is thus clear that only a few individual market demands are met by the above-specified arrangements from the state of the art. However, the disadvantages of all of the solutions fill entire lists.

Many consumer instruments thereby virtually call for new solutions for adjusting an imaging ratio, for instance cellular phones with cameras, cameras, camcorders, webcams, binoculars. The professional field comprising the same instruments and additionally telescopes, microscopes, stereomicroscopes, microscopes for medical procedures, magnifying glasses and microscopes worn on the head, also for medical procedures as well as for precision work, endoscopes, barcode readers, bio scanners, etc., is not actually satisfied with the present solutions.

According to one or more embodiments of the instant invention an optical arrangement for varying the imaging ratio and/or the refractive power is provided, which is cost-efficient, quick, compact, short, possibly two-dimensional, comprising a wide dynamic range with a high optical quality in all or almost all areas of use, possibly continuously or at least almost continuously, which can be developed easily, set up and adjusted easily and which can be controlled easily and which have small moments, if moved, and a low energy demand. Such a solution will be presented below in stages.

According to one or more embodiments of the invention, a clever variation of the direction or of the vergence of the optical path between the optical elements is provided, which can be pivoted into and which form the optical arrangement for varying the imaging ratio and/or of the refractive power, and/or a combination of the two solutions, as is specified in claim 1. The subclaims show advantageous embodiments of the invention.

In accordance with one or more embodiments of the present invention, it is possible to equip even the small cellular phone cameras with the adjusting possibility for different imaging ratios, namely discretely as well as virtually continuously and in addition with a wide dynamic range.

The term refractory power will be used hereinbelow in terms of the English expression "optical power" and is not only used in the case of refractive optical elements, e.g. lenses, but in the case of any type of optical transformation, e.g. also in the case of reflective elements and diffractive elements, such as mirrors and diffractive optical elements (DOEs), e.g.

An optical arrangement for varying an imaging ratio and/or a diffractive power in discrete steps is chosen as the starting point of one or more embodiments of the present invention. This arrangement is to encompass an optical axis, along which the light propagates through the arrangement. This arrangement is to also comprise at least two optical elements, which can be pivoted into and/or inserted into and/or pivoted to and/or switched into and/or switched to the optical path. The terms pivoted into and inserted into will be combined hereinbelow under "pivoted into". Each of these optical elements is to encompass a refractive power, which can also be zero. The case of refractive power being zero can be realized by means of a real optical element, e.g. a plane-parallel sheet of glass or also by means of a place holder. Each of the optical elements is to also encompass an optical axis. This optical axis is to either be capable of being made to be substantially congruent with the optical axis of the arrangement or is to be substantially congruent with the optical axis of the arrangement. According to one or more embodiments of the invention, the optical elements are substantially congruent with the optical axis of the arrangement in pairs or can be made to be substantially congruent with the optical axis of the arrangement in pairs. These optical elements can display a refractive and/or a diffractive and/or a reflective optical effect. In accordance with one or more embodiments of the present invention, these elements, which can be pivoted into and/or pivoted to and/or switched into and/or switched to, are lenses, but can also encompass other optical elements, which encompass a refractive power, e.g. mirrors, DOEs (diffractive optical element), prisms, mirrored prisms or combinations thereof. The description also still reads on the arrangement of FIG. 1. One of the biggest problems of this arrangement is the geometric size the large moments thereof. One way of approaching this problem is to combine the optical path, so that this geometric size shrinks. This can take place by using mirrors, but also by other optical elements having a deflecting effect, such as prisms, mirrored prisms, DOEs, waveguides, etc., e.g. According to one or more embodiments of the invention, these deflecting elements are used in the optical path between the optical elements, which can be pivoted into and/or pivoted to and/or switched into and/or switched to.

The arrangement of a vergence-varying element between the optical elements, which can be pivoted into and/or pivoted to and/or switched into and/or switched to, is a further possibility for further developing the state of the art. This vergence-varying element can thereby be movable or also stationary. The same also applies to the direction-changing (deflecting) element. The vergence change is to be realized by means of at least one lens and/or a mirror and/or a prism and/or a waveguide and/or a DOE and/or another optical element comprising vergence-varying optical characteristics.

In accordance with one or more embodiments of the present invention, the optical arrangement for varying an imaging ratio and/or a refractive power according to one or more embodiments of the invention does not encompass an intermediate image. However, the use of an arrangement comprising an intermediate image is also possible in special situations, which will be specified further below, in the case of which the use of an intermediate image is necessary.

The case without an intermediate image is typically realized by means of the at last two optical elements, which can be pivoted into and/or pivoted to and/or switched into and/or switched to, in particular lenses with refractive powers having different signs in pairs or with refractive powers being zero in pairs.

The case with an intermediate image is typically realized by means of the at least two optical elements, which can be pivoted into and/or pivoted to and/or switched into and/or switched to, in particular lenses having refractive powers with the same, in particular positive signs in pairs or having refractive powers being zero in pairs. In response to the use of the arrangement comprising an intermediate image, it must be considered that the intermediate image does not fall within the vicinity of the deflecting elements or these deflecting elements are to be of a very high optical quality. This is so, because dust or a low surface quality in the vicinity of the intermediate image are imaged very well, which manifests itself negatively in the imaging quality of the overall arrangement.

In accordance with one or more embodiments of the present invention, the mechanical arrangement of the at least two optical elements, which can be pivoted into and/or pivoted to and/or switched into and/or switched to, takes place on the same support. Depending on the total number of the optical elements, which can be pivoted into and/or pivoted to and/or switched into and/or switched to, the support is a bar, a cross or a star-shaped mechanical arrangement. In some cases, the support can be a circle or a ring or a drum. Other solutions, however, are also possible.

In accordance with one or more embodiments of the present invention, the at least two optical elements, which can be pivoted into and/or pivoted to, are arranged so as to be rotatable about an axis. However, they can also be arranged on a line and can be displaced in a linear manner. They can also be arranged so as to be capable of being tilted or pivoted.

A further feature of one or more embodiments of the invention is that the optical elements, which can be pivoted into and/or pivoted to and/or switched into and/or switched to, are pivoted into, pivoted to, switched into or switched to, respectively, in pairs. In accordance with one or more embodiments of the present invention, the optical elements, which can be pivoted into and/or pivoted to and/or switched into and/or switched to in pairs, each encompass a defined imaging ratio or a defined refractive power in pairs.

To realize a large dynamic range of an imaging ratio and/or of a refractive power, at least one optical arrangement for varying an imaging ratio and/or a refractive power in discrete steps and an optical arrangement for continuously varying an imaging ratio and/or a refractive power can be combined, so that the already mentioned characteristics appear in the combined arrangement.

In this context, a combination with at least one optical element having a variable refractive power on the side of the optical arrangement for continuously varying an imaging ratio and/or a refractive power seems particularly elegant and compact. This element can be positioned within the other arrangement for varying an imaging ratio and/or a refractive power in discrete steps, but also outside thereof, when it impacts the optical path within the arrangement and/or vice versa when the arrangement impacts the optical path at the location of the optical element having a variable refractive power. In accordance with one or more embodiments of the present invention, at least one optical element having a variable refractive power is thereby assigned to each element of a pair of the at least two optical elements, which are located in the optical path and which can be pivoted into and/or pivoted to and/or switched into and/or switched to. In accordance with one or more embodiments of the present invention, at least one optical element having a variable refractive power is further located upstream of or downstream from the respective one of the at least two optical elements, which can be pivoted into and/or pivoted to and/or switched into and/or switched to, which are located in the optical path, wherein the optical element having a variable refractive power and the optical element, which can be pivoted into, must not be directly adjacent. In accordance with one or more embodiments of the present invention, a lens having a variable refractive power is used as the optical element having a variable refractive power. This lens having a variable refractive power can include a liquid and/or a gel and/or liquid crystals and/or polymers and/or electroactive polymers and/or two liquids and/or can be controlled using the electro-wetting effect. Such lenses are sufficiently known. Examples of these lenses can be found in EP 1019758 or US 2005/0113912, the publication content of which is hereby adopted completely. However, a mirror or another optical element having a variable refractive power can also be used instead of a lens having a variable refractive power.

In accordance with one or more embodiments of the present invention, in the case of a combination of at least one optical arrangement for varying an imaging ratio and/or a refractive power in discrete steps and in the case of an optical arrangement for continuously varying an imaging ratio and/or a refractive power with optical elements having a variable refractive power, the detuning range of the optical arrangement for continuously varying an imaging ratio and/or of a refractive power will be chosen such that the gaps between the discrete imaging ratios and/or refractive powers are closed completely. To keep the demands on the optical arrangement for continuously varying an imaging ratio and/or a refractive power as low as possible, the discrete values of the imaging ratios and/or of the refractive power may be chosen in the same ratio to one another, so that the optical arrangement for continuously varying an imaging ratio and/or a refractive power is optimally adapted to all gaps. Through this, the correction effort for the optical errors becomes smaller. In any event, this is a topic in the case of the optical elements having a variable refractive power, in particular lenses having a variable refractive power.

In the event that the optical elements having a variable refractive power themselves form an optical arrangement for varying an imaging ratio and/or a refractive power with an imaging ratio and/or refractive power dynamic M ("detuning range"), the above-described facts can be expressed as follows: $M > M_{ij}$ for all $M_{ij} > 1$ and $M > 1/M_{ij}$ for all $M_{ij} < 1$, wherein $V_i = M_{i,j} * V_j$ and $V_i, V_j$ are the discrete imaging ratios or refractive powers of the arrangement, which follow one another.

In accordance with one or more embodiments of the present invention, the demands on the optical elements having a variable refractive power are considered to be rather small when an optical arrangement for varying an imaging ratio and/or a refractive power with optical elements having a variable refractive power encompasses an imaging ratio dynamic and/or refractive power dynamic M in the range of below 2.5. In accordance with one or more embodiments the M value may be below 2.0 or in one or more embodiments may be below 1.7. These specifications, however, are partly dependent on the number of the used lenses having a variable refractive power, on the control and on their distances from one another. On the other hand, an imaging ratio dynamic or refractive power dynamic M below 1.1 makes almost no sense; in accordance with one or more embodiments, an M value of at least 1.2 may be used, or in one or more embodiments $M >= 1.3$ may be used. In accordance with one or more embodiments, together with the demands on the optical elements having a variable refractive power, the result is a range for M of between 1.1 and 2.5. Further, in accordance with one or more embodiments, a range for M may be between 1.2 and 2.0, or in other embodiments, a range for M may be between 1.3 and 1.7.

In accordance with one or more embodiments, the optical elements having a variable refractive power are controlled such that the detuning range above the maximum and/or below the minimum discrete imaging ratio value and/or refractive power value of the optical arrangement for varying an imaging ratio and/or a refractive power in discrete steps is substantially half of the continuous detuning range of the arrangement of the optical elements having a variable refractive power.

In accordance with one or more embodiments, at least two optical elements having a variable refractive power are controlled in opposite direction in response to the detuning of the imaging ratio and/or of the refractive power, that is, when the refractive power of the one element is increased, the refractive power of the other element is reduced and vice versa when the refractive power of the one element is increased. Through this, the optical errors of the optical elements having a variable refractive power, which occur in response to the detuning thereof, can at least partially be corrected in a dynamic manner. Through this, it can oftentimes be attained that at least one optical error of at least two optical elements having a variable refractive power as a whole is smaller than the sum of the individual optical errors of the corresponding optical elements having a variable refractive power. It can furthermore oftentimes also be attained that at least one optical error of at least two optical elements having a variable refractive power as a whole is smaller than each individual optical error of the corresponding optical elements having a variable refractive power. Advantageously, an optical design is thus provided, in the case of which the optical errors of the elements having a variable refractive power are at least partially corrected by the arrangement thereof in pairs and/or by the suitable control thereof. Another possibility for correcting the optical errors is to choose the materials, which are used, in a sensible manner. On the one hand, materials, which do not cause any or only small optical errors per se, can be chosen. On the other hand, materials, the combination of which do not cause any errors, if possible, or cause only small optical errors, can be chosen. For instance, in the case of the lenses having a variable refractive power, which consist of two different liquids, e.g., it would be possible to choose these two liquids such that the optical error from the first liquid is eliminated or at least reduced in the second liquid. See US 2007/146490 with reference to this, the disclosure content of which is herewith adopted completely. In the case of lenses having a variable refractive power, which use liquids, it is also possible to use lenses comprising three and more liquids, at least two liquids of which must be different. These lenses form double and multi-lenses, which provide for even better correction possibilities.

Normally, not only the optical elements having a variable refractive power or generally the optical arrangement for continuously varying an imaging ratio and/or a refractive power require a correction of the optical errors. Other optical components, in particular the optical elements, which can be pivoted into and/or pivoted to, may be corrected.

The conventional way and thus the easiest way of correcting the optical elements, which can be pivoted into and/or pivoted to, is to already correct each optical element by itself and to then additionally apply an "anything" correction, if necessary. However, if every optical element is corrected by itself, this means, on the one hand, that the correction elements must also be pivoted into or pivoted to. On the other hand, the same parts of the correction and thus of the correction elements are used unnecessarily in the case of all of the correction elements. This represents an unnecessary additional expenditure of material, the consequence of which is a higher mass of the optical elements, which can be pivoted into and/or pivoted to and thus larger moments, which are necessary for moving the arrangement.

In accordance with one or more embodiments, a base correction outside of the optical elements, which can be pivoted into and/or pivoted to, in the stationary part of the device, which contains the arrangement, but not necessarily used for the optical elements, which can be pivoted into and/or pivoted to. This base correction can be applied at one location, but also at two and more locations. All of the optical elements, which can be pivoted into and/or pivoted to, have this base correction in common. In accordance with one or more embodiments, the remaining correction then takes place within the movable part of the arrangement, for example, at the optical elements, which can be pivoted into and/or pivoted to, themselves.

Due to the fact that the optical elements, which can be pivoted into and/or pivoted to, normally have different sizes, it may be sensible, for a better weight distribution and/or to reduce weight, to apply the main part of the correction or the entire correction for the optical elements, which can be pivoted into and/or pivoted to, at the respective smaller components.

The correction of at least one of the respective optical elements takes place by means of a combination of other optical elements, so that the resulting optical element is in each case at least partially corrected with respect to at least one optical error. The use of a combination of lenses having a negative and positive refractive power, which can be interlinked in parts, is common.

In accordance with one or more embodiments disclosed herein, to avoid high masses of the optical elements, which can be pivoted into and/or pivoted to, and thus large moments when moving the arrangement, the optical elements, which can be pivoted into and/or pivoted to, may be made of plastic and/or of light metal and/or of other weight-saving materials and/or of a combination of these materials. However, the use of other materials, e.g. glass, is possible in response to certain demands.

An optical arrangement according to one or more embodiments of the invention can be realized in different ways. One possibility is to allow the optical axes of the optical elements, which can be pivoted into and/or pivoted to, to run substantially parallel to the axis of the rotation of the arrangement. In accordance with one or more embodiments disclosed herein, they can rotate equidistant about this axis of rotation. In this case, the surfaces of the optical elements, which can be pivoted into, are arranged substantially parallel to the rotation plane.

Another possibility of realizing the optical arrangement according to one or more embodiments of the invention is to allow the optical axes of the optical elements, which can be pivoted into and/or pivoted to, to run substantially perpendicular to the axis of rotation of the arrangement. The optical axes of the optical elements, which can be pivoted into and/or pivoted to, are thereby substantially parallel to the rotation plane of the arrangement or in the rotation plane of the arrangement.

The optical arrangement according to one or more embodiments of the invention can also consists of any two of the above-described arrangements, even similar ones, within a connected optical path, wherein the combination must not necessarily encompass a change in direction or a vergence variation. The two included optical arrangements can thereby be nested within one another, they can immediately follow one another or can be connected to one another via further optical components.

The optical arrangement according to one or more embodiments of the invention can also consist of an optical arrangement for varying an imaging ratio and/or a refractive power, e.g. in discrete steps, wherein the arrangement does not necessarily have to encompass a change in direction or a vergence variation, and of any optical arrangement for continuously varying an imaging ratio and/or a refractive power within a connected optical path. The two included optical arrangements can thereby be nested within one another, they can immediately follow one another or can be connected to one another via further optical components. In accordance with one or more embodiments disclosed herein, this combination of the optical arrangements may encompass the characteristic that the optical arrangement for continuously varying an imaging ratio and/or a refractive power can be controlled such that the intermediate imaging ratio values or intermediate refractive power values are supplied continuously to the discrete values of the other arrangement. It can thereby apply that the optical arrangement for continuously varying an imaging ratio and/or a refractive power has an imaging ratio dynamic and/or refractive power dynamic M, wherein:

$M > M_{ij}$ for all $M_{ij} > 1$ and $M > 1/M_{ij}$ for all $M_{ij} < 1$, wherein $V_i = M_{ij} * V_j$ and $V_i$, $V_j$ are the discrete imaging ratios or refractive powers, which follow one another, of the other arrangement for varying an imaging ratio and/or a refractive power in discrete steps alone. In accordance with one or more embodiments, the optical arrangement for continuous varying an imaging ratio and/or a refractive power may again encompasses an imaging ratio dynamic and/or refractive power dynamic M in the range of 1.1 to 2.5. Further, in accordance with one or more embodiments, the M range may be between 1.2 and 2.0, or in one or more embodiments the M range may be 1.3 to 1.7. The optical arrangement for continuously varying an imaging ratio and/or a refractive power can be controlled such that the detuning range above the maximum and/or below the minimum discrete imaging ratio value and/or the refractive power value of the other optical arrangement for varying an imaging ratio and/or a refractive power in discrete steps is substantially half of the continuous detuning range of the optical arrangement for continuously varying an imaging ratio and/or a refractive power.

In accordance with one or more embodiments of the present invention, the time for the change between the adjacent discrete positions $V_i$ and $V_j$ of the optical arrangement for varying an imaging ratio and/or a refractive power in discrete steps and the time for completely detuning the optical arrangement for continuously varying an imaging ratio and/or a refractive power by substantially $M'=M_{ij}$ differ by less than a factor 10. Alternatively, in accordance with one or more embodiments, the time for change may differ by less than a factor 3, or in accordance with one or more embodiments by less than a factor 2. Alternatively still, in accordance with one or more embodiments disclosed herein, the time may differ by less than a factor 1.5.

In accordance with one or more embodiments of the present invention, the time for the change between two non-adjacent discrete positions $V_i$ and $V_k$ of the optical arrangement for varying an imaging ratio and/or a refractive power in discrete steps is shorter than two-times. Alternatively, in accordance with one or more embodiments, the time for change may be shorter than 1.5-times, or in accordance with one or more embodiments, may be shorter than 1.2-times. Alternatively still, in accordance with one or more embodiments the time may be shorter than 1.1-times the time for the change between two adjacent discrete positions $V_i$ and $V_j$.

In accordance with one or more embodiments disclosed herein, it applies for the described optical arrangements that there are ranges in the values of the imaging ratios and/or the refractive powers, in which individual values of the imaging ratios and/or refractive powers can be controlled by different combinations of the discrete and continuous values.

In view of the optical arrangement for continuously varying an imaging ratio and/or a refractive power with mechanically moved parts, which is included in the optical arrangement, it may apply that the mechanical movement is realized by means of piezoelectric or another control, which is characterized by speed across short distances. It is thus utilized that the lens or the lenses of the arrangement are only moved across short distances due to a small imaging ratio and/or refractive power dynamic M. As an additional advantage, it results therefrom that the correction effort of the arrangement remains small.

In particular for the small arrangements, it can be advantageous that the movable or rotatable part thereof, respectively, is substantially produced as a whole, which includes optical as well as mechanical elements. The production can take place in a molding process, in particular in an injection molding process, by etching or laser or liquid beam processing or the combinations thereof from a base material, in particular from a piece of base material.

An optical arrangement for varying the refractive power comprising some of the above-described characteristics can be used as a variable lens in an optical device. However, it can also be used as a variable ocular. In the arrangement, one of the elements, which can be pivoted into and/or pivoted to and/or switched into and/or switched to, can be assigned to the ocular and one can be assigned to the lens and/or one can be assigned to the ocular and one to the another functional part of an optical device and/or one can be assigned to the lens and one to another functional part of an optical device.

For optical devices and instruments, which are to be particularly compact or flat and which include the arrangement according to one or more embodiments of the invention, it may be advantageous that the optical radiation is coupled into this arrangement and/or is uncoupled from this arrangement via at least one deflecting device. This deflecting device can be a mirror or a prism or a mirrored prism, e.g.

It may be advantageous for some applications that the optical arrangement according to one or more embodiments of the invention and/or the device including it includes a further device, which has the effect that this optical arrangement can receive radiation from at least two different solid angles and/or can send in at least two solid angles. Such a device can be an adjustable mirror and/or a rotating mirror and/or a rotating prism and/or two prisms or optical wedges rotating against one another and/or a tilting device and/or a pivoting device and/or a rotating device and/or an electrically and/or magnetically controlling deflecting device. The applications, which necessitate such a device, could include a surveillance camera, a webcam, a bio scanner, e.g. for pupil or face recognition or a driver assistance system in a vehicle, wherein a vehicle is to be understood as any mobile technical and non-technical system comprising its own drive.

Even in the event that the arrangement according to one or more embodiments of the invention is considerably better smaller and more efficient than corresponding arrangements from the state of the art, further improvements are possible. In accordance with one or more embodiments of the present invention, the optical elements of the arrangement, which can be pivoted into and/or pivoted to, may be arranged such that the unbalance of the movable part of the arrangement is as small as possible in response to the rotation when attaining the characteristics. In accordance with one or more embodiments of the present invention, where appropriate (see description of the drawings), the movable optical elements of the arrangement may be arranged equidistant around the axis of rotation. Also where specified, the movable optical elements of the arrangement may be arranged at different distances from the axis of rotation, whereby the heavier ones of the movable optical elements of the arrangement may be at least partly arranged so as to closer to the axis than the lighter ones.

For certain purposes, a device, which includes an alternative of the described optical arrangement, can also include actuators for the controllable optical and/or mechanical and/or piezoelectric and/or hydraulic and/or pneumatic elements and/or for elements, which operate according to the principle of electro-wetting and/or further elements, which can be used for actuating purposes, a control as well as a connection between the optical arrangement or the actuators thereof, respectively, and the control. This device can furthermore include measuring devices or measuring heads, respectively, at least one control/recording device for the measuring devices or measuring heads, respectively, or at least one connection between the control/recording device for the measuring devices or measuring heads, respectively, and the measuring devices or measuring heads, respectively. It can, but does not have to include a measuring value display, a unit for wired and/or wireless communication with other wired and/or wireless communication units, a processing unit comprising optionally a storage possibility and/or a software or hardware evaluation unit and/or a unit for inputting and/or outputting further information and/or a unit for wired and/or wireless communication with other wired and/or wireless communication units, which are possibly components of other processing units or communication instruments, a connection between the control of the actuators and the control/recording instrument for the measuring devices or measuring heads, respectively, an analog or digital regulating unit or a connection which realizes the creation of a control loop. In accordance with one or more embodiments, such a device is capable of storing image and/or speech and/or other audio data and/or measuring value data and/or to send and/or receive them in a wired and/or wireless manner.

In many instruments, e.g. a cellular phone with a camera, a camera, a video camera, a webcam, a microscope, an endoscope, a slit lamp microscope, a barcode reader, a bio scanner, a vehicle with or without a driver assistance system, a magnifying glass or microscope worn on the head, or a stereo alternative of these instruments, at least one optical arrangement or a combination of the optical arrangements according to the instant description can advantageously be used in the imaging optical path and/or in the illuminating optical path of the instrument.

The method for controlling one of the above optical arrangements can take place in discrete steps and/or continuously and/or virtually continuously.

The method for controlling one of the above optical arrangements or any optical arrangement can advantageously include at least the following steps:
  detuning the optical arrangement for continuously varying an imaging ratio and/or a refractive power in a first direction
  stopping the optical arrangement for continuously varying an imaging ratio and/or a refractive power
  returning the optical arrangement for continuously varying an imaging ratio and/or a refractive power in a second direction by substantially $M'=M_{ij}$, when the overall arrangement between the discrete positions $V_i$ and $V_j$ and the optical arrangement for varying an imaging ratio and/or a refractive power in discrete steps was in the discrete position $V_i$ and simultaneously varying the adjustment of the optical arrangement for varying an imaging ratio and/or a refractive power in discrete steps from the position $V_i$ into the position $V_j$
  further detuning the optical arrangement for continuously varying an imaging ratio and/or a refractive power in the first direction.

The method in accordance with one or more embodiments is advantageously characterized in that the steps stopping and returning may take less than 1.0 seconds. Further, in accordance with one or more embodiments, the steps stopping and returning may take less than 0.5 seconds, or in accordance with one or more embodiments may take less than 0.2 seconds. Further, in accordance with one or more embodiments, the steps stopping and returning may take less than 0.1 seconds.

The method in accordance with one or more embodiments is advantageously also characterized in that the varying of the adjustment of the optical arrangement for varying an imaging ratio and/or a refractive power in discrete steps from the position $V_i$ into the position $V_j$ takes less than 1.0 seconds. Further, in accordance with one or more embodiments, the varying of the adjustment of the optical arrangement for varying an imaging ratio and/or a refractive power in discrete steps from the position $V_i$ into the position $V_j$ takes less than 0.5 seconds, or in accordance with one or more embodiments less than 0.2 seconds, or in accordance with one or more embodiments less than 0.1 seconds.

Advantageously, the optical path is not utilized for the observation during the steps stopping and returning. In accordance with one or more embodiments, this non-utilization of the optical path for the observation can be carried out by blocking and/or defocusing of the optical path.

BRIEF DESCRIPTION OF DRAWINGS

Further details and embodiments of the invention will be described by means of the drawings:

FIG. 8 shows a further embodiment of the optical arrangement for varying an imaging ratio and/or a refractive power according to one or more embodiments of the invention in discrete steps comprising two lenses and comprising the axis of rotation perpendicular to the plane of the optical path. Top view onto the plane of the optical path.

FIG. 10 shows a further embodiment of the optical arrangement for varying an imaging ratio and/or a refractive power according to one or more embodiments of the invention in discrete steps comprising four lenses and with the axis of rotation perpendicular to the plane of the optical path. Top view onto the plane of the optical path. FIG. 10a, 0° position: first lens pair in the optical path. FIG. 10b, 90° position: second lens pair in the optical path. FIG. 10c, 180° position: first lens pair in the optical path, reverse order of case 10a. FIG. 10d, 270° position: second lens pair in the optical path, reverse order of case 10b.

FIG. 17 shows a further embodiment of the optical arrangement for varying an imaging ratio and/or a refractive power according to one or more embodiments of the invention in discrete steps (further development of FIG. 1).

FIG. 18 shows a further embodiment of the optical arrangement for varying an imaging ratio and/or a refractive power according to one or more embodiments of the invention in discrete steps (further development of FIG. 7).

DETAILED DESCRIPTION

The invention is not limited to the illustrated exemplary embodiments, but is only limited by the claims. As shown, the optical elements can thus be lenses, but they can also be replaced by other optical elements. The deflection angles and the numbers of deflections can be different, without leaving the scope of protection. All combinations of the presented arrangements, the number of which is very high, also fall within the scope of protection of the invention.

Figure 1:
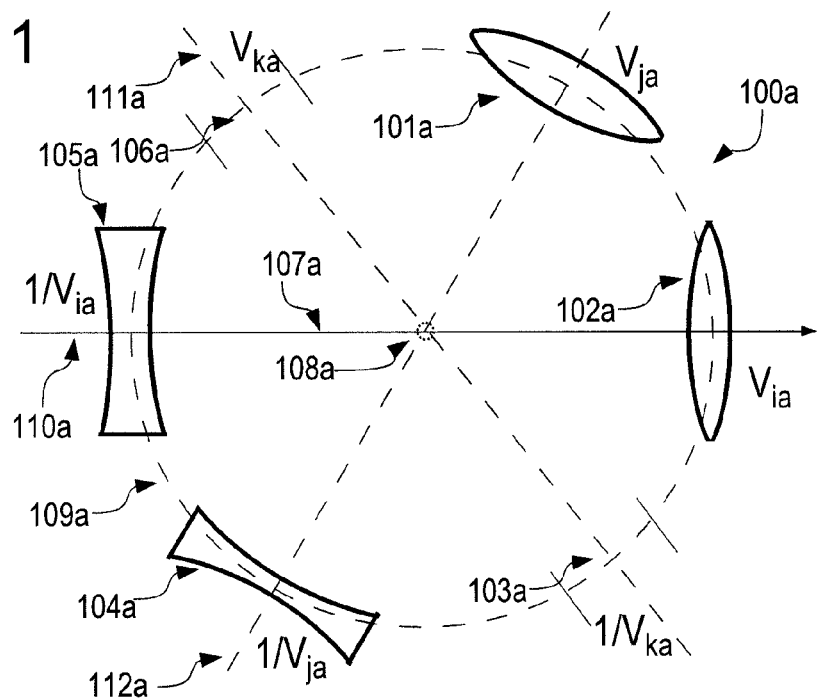
FIG. 1 shows an optical arrangement for varying an imaging ratio and/or a refractive power in discrete steps (state of the art).

FIG. 1 illustrates an optical arrangement 100a for varying an imaging ratio and/or a refractive power in discrete steps, belonging to the state of the art. The lenses 101a, 102a, 104a and 105a, assembled on a drum or on a laterally arranged star-shaped support, e.g., can be rotated about the mechanical movement axis 108a on the circular path 109a and can thus be pivoted into the optical path with the optical axis 107a. Each lens pair encompasses a common optical axis 110a, 111a or 112a and can be positioned in two different positions in the optical path and can thus create an imaging ratio of greater than or equal to one and an imaging ratio of less than or equal to one, e.g. $V_{ia}$ in each case and $1/V_{ia}$ in the other case. The imaging ratio is determined by the lens having the V-identifier, which is located in the optical path about the optical axis 107a at the optical output of the arrangement (here $V_{ia}$). Typically, such an arrangement includes a position, which is not occupied by lenses (in FIG. 1 the position with the place holders 103a and 106a with $V_{ka}=1/V_{ka}=1$). In this case, the original imaging ratio is not changed. For formal reasons, these place holders are partly identified as elements having the refractive power zero. Typically, but not necessarily, such an arrangement includes three or five different imaging ratios in the case of two place holders and two or four lenses, respectively. In the case of a complete occupation comprising four or six lenses, there are four or six imaging ratios, respectively. Under certain circumstances, there can also be more imaging ratios. An intermediate image appears or does not appear between the lenses, depending on whether the respective lens pairs consist of two lenses having a positive refractive power or in each case of one lens having a positive and negative refractive power. In FIG. 1, the case without an intermediate image is illustrated. For the variation of an imaging ratio alone (the afocal case), the lenses satisfy the condition that the sum of the focal lengths is equal to the lens distance.

In accordance with one or more embodiments of the present invention, the case without an intermediate image may be more compact, even though the arrangement still remains very large. The case with the intermediate image is used in the rare cases, in which an intermediate image is required for restoring the imaging quality, due to the length of the optical path. For the most part, this arrangement then does not include any place holders, but is fully occupied with lenses, because an additional inverter (which can be pivoted into) would otherwise be required for the position with the place holders due to the image reversal. This would even further increase the dimensions of the arrangement.

Typically, the optical elements are arranged in pairs substantially equidistant about the mechanical axis, in particular, they are typically arranged substantially equidistant about the mechanical axis.

The lenses, which are illustrated as single lenses to simplify matters, are typically lens groups, the partial lenses of which are often interlinked. The optical errors of the arrangement are corrected through this. The correction possibilities are good to very good. Even in the event that the optical elements illustrated in FIG. 1 are lenses, these optical elements are not limited to lenses. The lenses could, even partly, be replaced with other optical elements, which encompass a refractive power, e.g. mirrors, DEOs, or the like. In such cases, an adaptation of the optical path to these optical elements would sometimes be necessary.

The serious disadvantages of the arrangement in FIG. 1 are the very large geometric dimensions, high weight, large volume and the few discrete imaging ratios, as well as the high torques of the arrangements, which are not acceptable in most cases. In some cases, almost the entire moved mass is located on the outside, which can be attributed to the fact that the optical axis and the axis of rotation of the arrangement intersect. More or less extensive solutions are then necessary to make the point of intersection of the mechanical axis of rotation virtual by displacing the mechanical arrangement out of the optical path.

Figure 2:
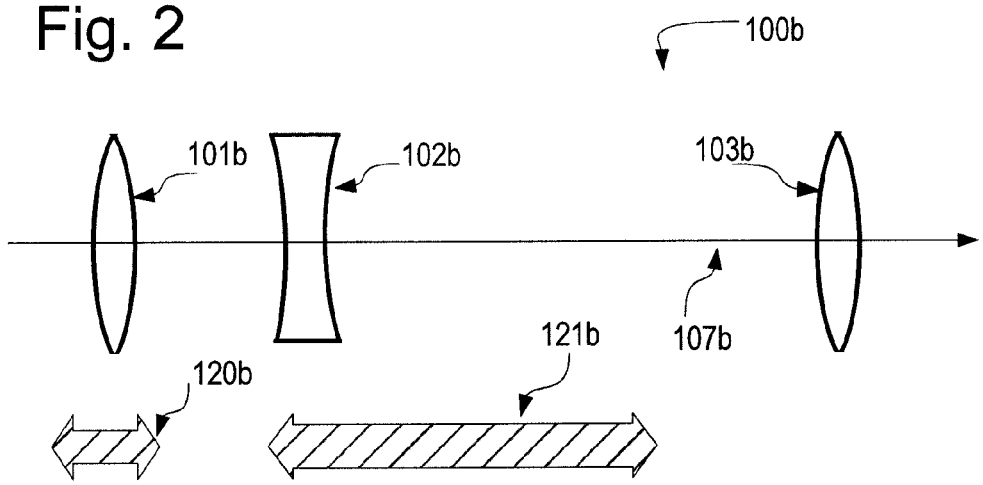
FIG. 2 shows an optical arrangement for continuously varying an imaging ratio and/or a refractive power (state of the art).

FIG. 2 represents a simple alternative of an optical arrangement for continuously varying an imaging ratio and/or a refractive power 100b according to the state of the art, wherein two of the three lenses are arranged along the optical axis 107b so as to be capable of being displaced along the paths 120b and 121b. Typically, the lenses, which are also illustrated herein as single lenses to simplify matters, are lens groups, the partial lenses of which are often interlinked with one another.

In this most simple design, the illustrated afocal system consists of two lenses having a positive refractive power 101b and 103b and of a lens having a negative refractive power 102b having twice the intensity, which is arranged between the lenses having a positive refractive power. Such a system cannot generate an image, but has a variable imaging ratio, depending on the position of the lens having a negative refractive power. In the event that the system is connected upstream of a focusing lens group, the focal length of the overall system changes, but not the image position when the lens having a negative refractive power is displaced. One of the lenses having a positive refractive power 103b is thereby fixed and the other one is moved in a non-linear manner to the lens having a negative refractive power. The imaging ratio can be varied continuously by means of this arrangement, but in the case of this simple version only in a minimum dynamic range M; otherwise, devastating optical errors manifest themselves. In the event that this range is to be expanded, a correction must be made in an extensive manner by using considerably more carefully selected lenses and/or larger dimensions must be allowed and/or particular solutions must be sought in response to the arrangement of the lenses. The advantage of the continuously variable focal length is opposed by a very high optical and mechanical construction effort. Further disadvantages have already been discussed in detail above.

FIG. 3 illustrates an embodiment of the optical arrangement 100c for varying an imaging ratio and/or a refractive power according to one or more embodiments of the invention in discrete steps comprising two lenses 101c and 102c, which can be pivoted into by means of rotation about the axis of rotation 108c, and comprising an axis of rotation 108c parallel to the optical axes 110c and 111c of the optical elements 101c and 102, respectively. The top view onto the plane of the optical path comprising the optical axis 107c, also spread out by the optical axes of the optical elements, is shown. Comparable to FIG. 1, this is an arrangement of lenses, in this case two lenses 101c and 102c, which are arranged so as to be rotatable about the mechanical axis 108c. Contrary to FIG. 1, however, the rotational plane of the lenses is perpendicular to the plane of the optical path. The optical axes 110c and 111c of the lenses coincide with the optical axis of the overall optical path 107c. The mechanical axis 108c and the optical axis of the overall optical path 107c are located in the same plane. The mechanical axis 108c and the optical axis of the overall optical path 107c in the area of the lenses are parallel to one another. This is not absolutely necessary for each and every embodiment of the invention, but makes the arrangement simpler and more clearly arranged.

Figure 3A:
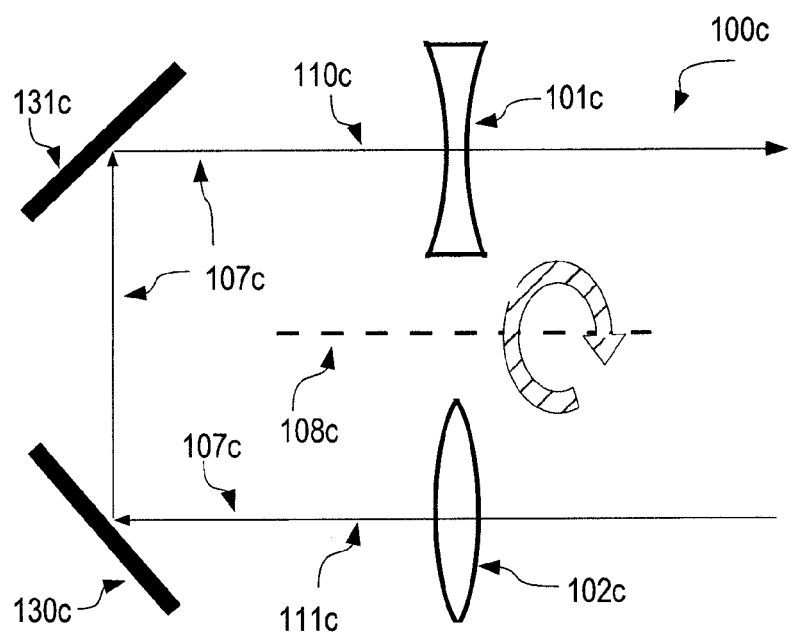
FIGS. 3a and 3b show an embodiment of the optical arrangement for varying an imaging ratio and/or a refractive power according to one or more embodiments of the invention in discrete steps comprising two lenses and comprising an axis of rotation parallel to the optical axes of the optical elements. Top view onto the plane of the optical path.

Initially, the optical path in FIG. 3a runs through the first lens having a positive refractive power 102 to the first mirror 130c, at which it is deflected by 90°, then further to the second mirror 131c, where it is subjected to a second deflection of 90°. There does not necessarily have to be two deflections and also not necessarily by 90°. However, this arrangement can be designed and overseen in a particularly simple manner. The optical path further runs through the second lens 101c having the negative refractive power and leaves the arrangement. The arrangement encompasses an imaging ratio of $1/V_{ic}$ with $V_{ic} > 1$ herein.

Figure 3B:
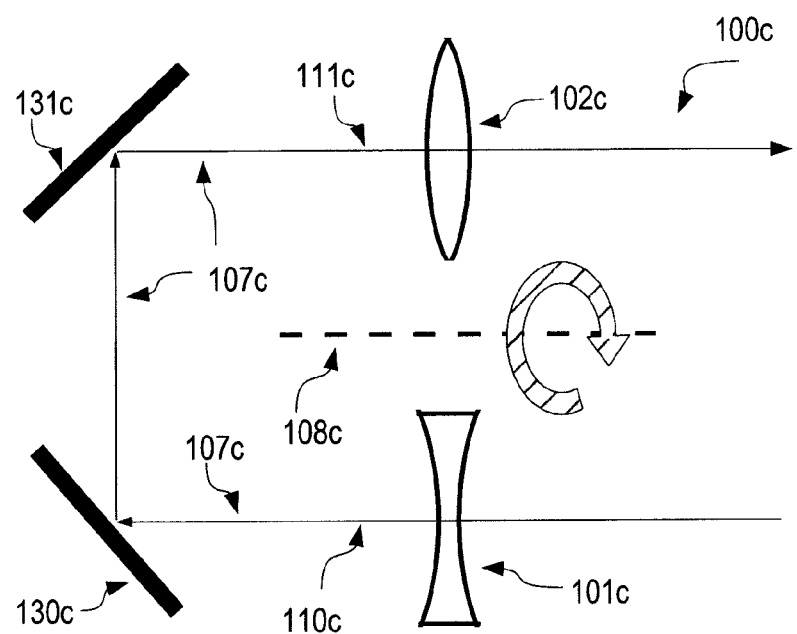

In FIG. 3b, the lenses 101c and 102c are rotated about the axis of rotation 108c as compared to the arrangement from FIG. 3a by 180°. The optical path in FIG. 3b now runs initially through the first lens having a negative refractive power 103c to the first mirror 130c, at which it is deflected by 90°, then further to the second mirror 131c, where it is subjected to a second deflection of 90°. The optical path furthermore runs through the second lens 102c having the positive refractive power and leaves the arrangement. The arrangement now encompasses an imaging ratio of $V_{ic}$ with $V_{ic} > 1$. The lens 102c is a lens having a positive refractive power and the lens 101c is a lens having a negative refractive power. Similar to FIG. 1, this is thus a case without an intermediate image. An equipping with two lenses having a positive refractive power would also be possible. On the one hand, this would lengthen the optical path considerably. On the other hand, it would have to be ensured that the intermediate image, which is now available, is not generated in the vicinity of the mirrors or the mirrors would have to encompass a very high optical quality, so as not to negatively impact the imaging quality of the arrangement, because all of the surfaces on the mirrors as well as dust are imaged in the vicinity of the intermediate image in a highly accurate manner.

Figure 4:
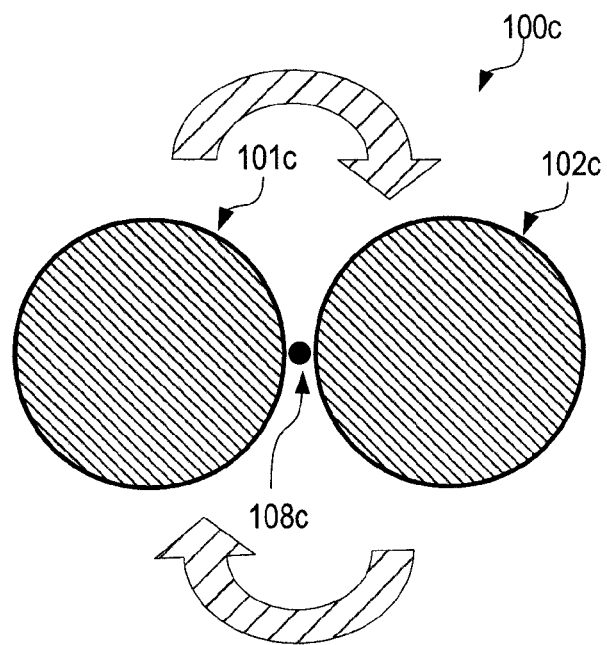
FIG. 4 shows an embodiment of the optical arrangement for varying an imaging ratio and/or a refractive power according to one or more embodiments of the invention in discrete steps comprising two lenses and comprising an axis of rotation parallel to the optical axes of the optical elements. View from the front/the back in the direction of the optical path.

From another perspective, FIG. 4 shows the arrangement described above. It can be seen from the front/back in the direction of the optical path. To simplify matters, only the lenses and the mechanical axis of rotation are illustrated. The optical axes of the lenses run through the centers thereof (not illustrated).

The large difference to the arrangement from FIG. 1 is that the linear geometric dimensions of the rotating unit with the lenses, which can be pivoted into, are considerably smaller in response to the same optical paths, namely at least by a factor 2 to 4, depending on the application. Due to the fact that the overall dimensions are substantially determined by the dimensions of the optical elements themselves, here the lenses, and not by the distance thereof along the optical path, the expansion outside of the plane of the optical path even during the pivoting into/pivoting in of the lenses is not much greater than the dimensions of the optical elements. The surfaces and volumes, which are included by the arrangement according to FIGS. 3 and 4 during operation, are smaller than those of the arrangement according to FIG. 1, approximately be a factor 4 to 10, again depending on the application.

This alternative of the solution according to one or more embodiments of the invention is particularly compact, light, quick and has a low energy consumption. However, only two different imaging ratios are possible by means of only two optical elements (here: lenses) or groups of such elements: $V_{ic}$ and $1/V_{ic}$. Compared to the arrangement of FIG. 1, the moments are smaller by a size of approx. one, on the one hand due to shorter levers, on the other hand due to the weight distribution closer to the axis and, of course, also due to the use of only one lens pair instead of two.

A possible, but not exclusive assembly proposal would be to assemble the lenses on both sides on a very short bar, which connects the two lenses and which rests in the center on the mechanical axis.

To simplify matters, the lenses have been shown herein and partly below as having the same size. In practice, the lenses will often encompass different sizes, adapted to the actual ratios in the optical path, see FIGS. 17 and 18.

Figure 5:
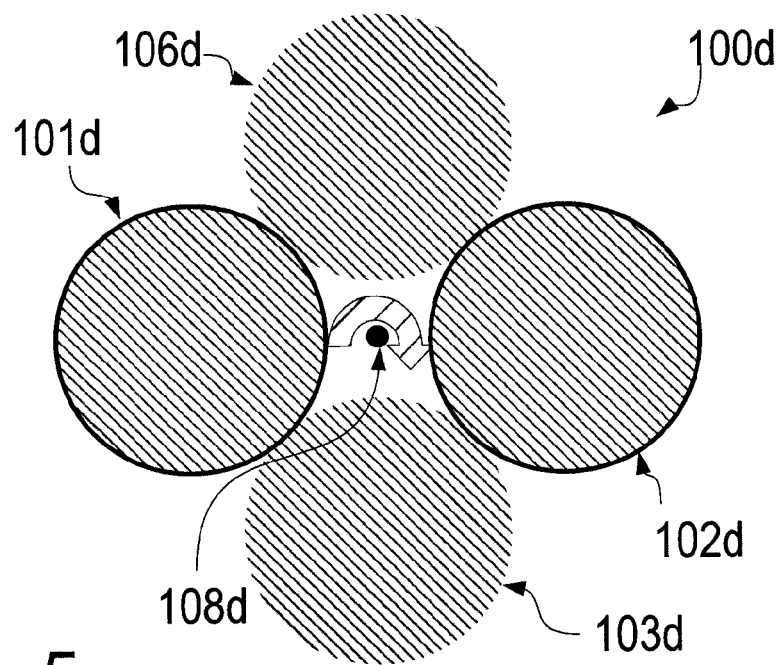
FIG. 5 shows a further embodiment of the optical arrangement for varying an imaging ratio and/or a refractive power according to one or more embodiments of the invention in discrete steps comprising two lenses and two place holders comprising an axis of rotation parallel to the optical axes of the optical elements. View from the front/back in the direction of the optical path.

The next one of the simplest solutions 100d, shown in FIG. 5, does not require much more space than the one shown in FIG. 4, but offers three different imaging ratios: 1, $V_{id}$ and $1/V_{id}$, due to two additional positions 103d and 106d (place holder: refractive power is zero in each case), which are free from optical elements. The imaging ratio 1 can be reached in both positions of the arrangement, in which the two place holders are located in the optical path. The imaging ratio $V_{id}$ with $V_{id} > 1$ is reached with the lens having a negative refractive power 101d at the beginning and with the lens having a positive refractive power 102d at the exit of the arrangement. The imaging ratio $1/V_{id}$ is reached with the reverse arrangement of the lenses by means of a rotation of the arrangement by 180°. The remaining characteristics are similar to the solution from FIG. 4. To simplify matters, only lenses 101d and 102d, the place holders 103d and 106d and the mechanical axis of rotation 108d have been shown. The difference to FIG. 4 lies in the slightly larger radial distance of the lenses, so that the place holders have the full clear opening for the optical path. In the case of the distance of the lenses from FIG. 4, the optical path would otherwise be partly cut.

The top view of the arrangement from FIG. 5 onto the plane of the optical path is virtually the same as that of FIG. 3, except for the slightly larger lens distance from the axis of rotation. However, the case with the lenses outside of the optical path 107c should also be added to the cases 3a and 3b.

A possible, but not exclusive assembly proposal would here also be to assemble the lenses on both sides on a bar, which connects the two lenses and which rests in the center on the mechanical axis. However, the bar length would have to be slightly greater in this case than in FIG. 4 according to the demands.

The moments of this arrangement are only marginally larger than in the case of FIG. 4. A similarly favorable weight distribution is at hand, the levers are slightly larger due to the slightly longer bar length.

Figure 6:
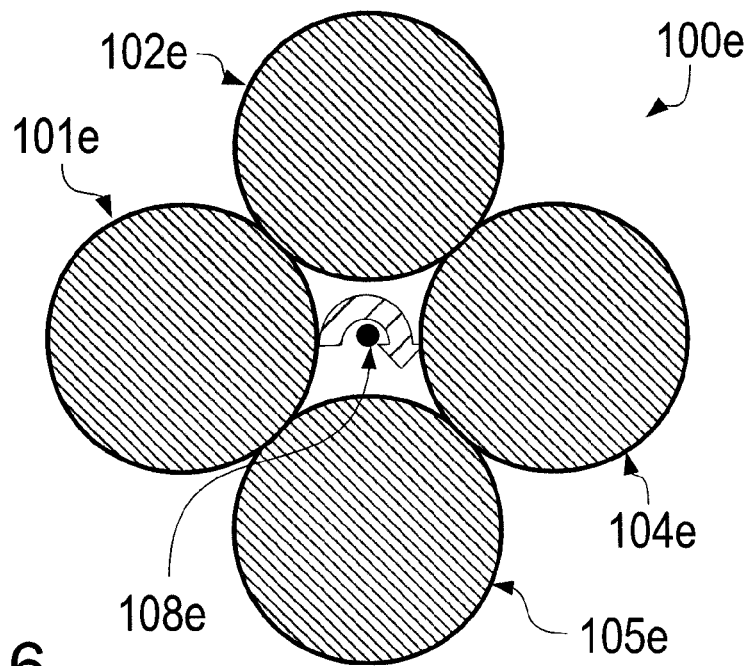
FIG. 6 shows a further embodiment of the optical arrangement for varying an imaging ratio and/or a refractive power according to one or more embodiments of the invention in discrete steps comprising four lenses and comprising an axis of rotation parallel to the optical axes of the optical elements. View from the front/back in the direction of the optical path.

FIG. 6 shows a further embodiment of the optical arrangement 100e for varying an imaging ratio and/or a refractive power according to one or more embodiments of the invention in discrete steps, now comprising four lenses 101e, 102e, 104e and 105e and with the mechanical axis of rotation 108e parallel to the optical axes of the optical elements. The type of view from the front/back in the direction of the optical path is again the same as in FIGS. 4 and 5. The top view, similar to that in FIG. 3, can be envisioned easily. The refractive powers of the lenses having a positive refractive power 101e and 102e thereby differ from one another. The same applies for the lenses having a negative refractive power 104e and 105e. The solution, which is only slightly more complex than the solution in FIG. 5, offers four different imaging ratios: $V_{ie}$, $V_{je}$, $1/V_{ie}$, and $1/V_{je}$ with four optical elements or element groups (wherein the two free spaces from FIG. 5 have been filled with lenses). To simplify matters, only lenses and the axis of rotation have again been shown.

A possible assembly proposal, which is one of the simplest, but again not an exclusive one, assembly proposal would be herein to assemble the lenses on a cross or on two crossed bars, which connect the lenses. The cross or the crossed bars would rest in the center on the mechanical axis. The lens distance corresponds to that of FIG. 5

Even though, due to the four lenses instead of two, the moments are much higher than in FIG. 5, the radial weight distribution and the lever length, however, are substantially the same. The moments are thus up to one order of magnitude smaller than in the classic arrangement from FIG. 1.

Figure 7:
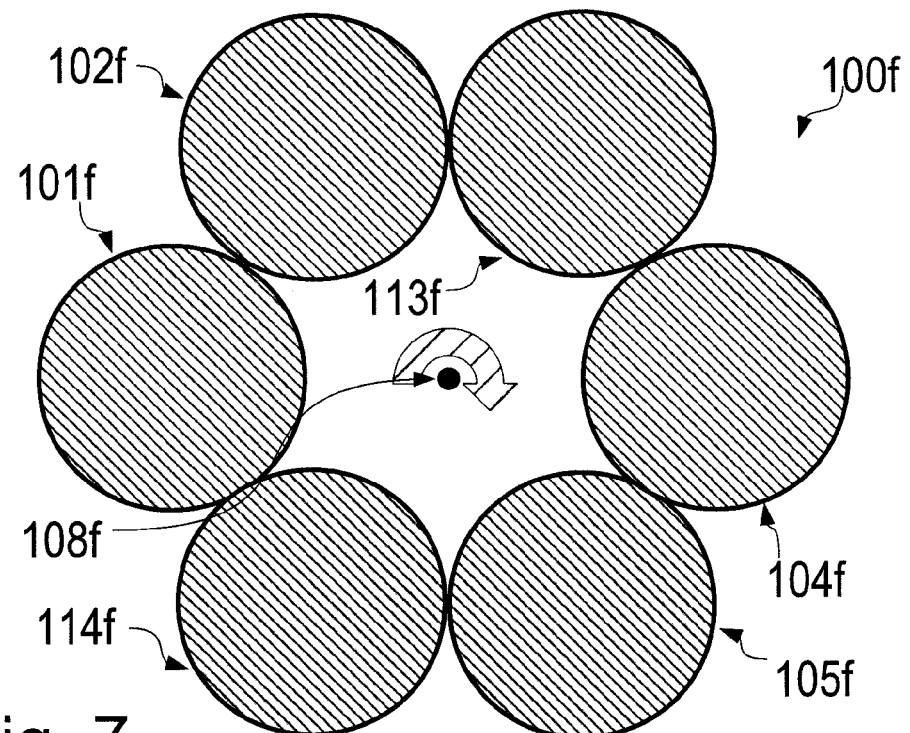
FIG. 7 shows a further embodiment of the optical arrangement for varying an imaging ratio and/or a refractive power according to one or more embodiments of the invention in discrete steps comprising six lenses and comprising an axis of rotation parallel to the optical axes of the optical elements. View from the front/back in the direction of the optical path.

FIG. 7 shows a further embodiment of the optical arrangement 100f for varying an imaging ratio and/or a refractive power according to one or more embodiments of the invention in discrete steps, here comprising six lenses 101f, 102f, 113f, 104f, 105f and 114f and with an axis of rotation 108f parallel to the optical axes of the optical elements. The view is similar to that in FIGS. 4 to 6 from the front/back in the direction of the optical path. The top view onto the plane of the optical path similar as in FIG. 3, only supplemented by several lenses, can again be envisioned easily.

The solution from FIG. 7 encompasses six optical elements or element groups and thus offers six different imaging ratios: $V_{if}$, $V_{jf}$, $V_{kf}$, $1/V_{if}$, $1/V_{jf}$ and $1/V_{kf}$. If two spaces had suitably been left free, five different imaging ratios: 1, $V_{if}$, $V_{jf}$, $1/V_{if}$ and $1/V_{jf}$ would result. To simplify matters, only the lenses and the axis of rotation have been shown in the image.

A possible assembly proposal, which is one of the simplest, but again not an exclusive one, would be to assemble the lenses on a star-shaped support comprising six arms or three bars, which are crossed under 120°, which connect the lenses. The star-shaped support or the crossed bars would rest in the center on the mechanical axis. The lens distance is slightly larger than that of FIG. 6. When omitting a lens pair, one bar or two arms of a star-shaped support could also be omitted.

Due to the larger lens distance, the moments are slightly larger when using four lenses and are accordingly larger when using six lenses. The moments, however, are still almost one order of magnitude smaller than in FIG. 1. FIG. 18 shows a practice solution comprising radial lens distances, which are the same as in FIGS. 5 and 6 in spite of more lenses.

The arrangements from FIGS. 3 to 7 have in common that the axis of rotation coincides with the real and not with the virtual mechanical axis, which makes the entire arrangement, including the mechanics, simpler and lighter. It is furthermore also possible to position two or more rotary devices next to one another, which expands the dynamic of the arrangement enormously by means of a finite effort.

Figure 8A:
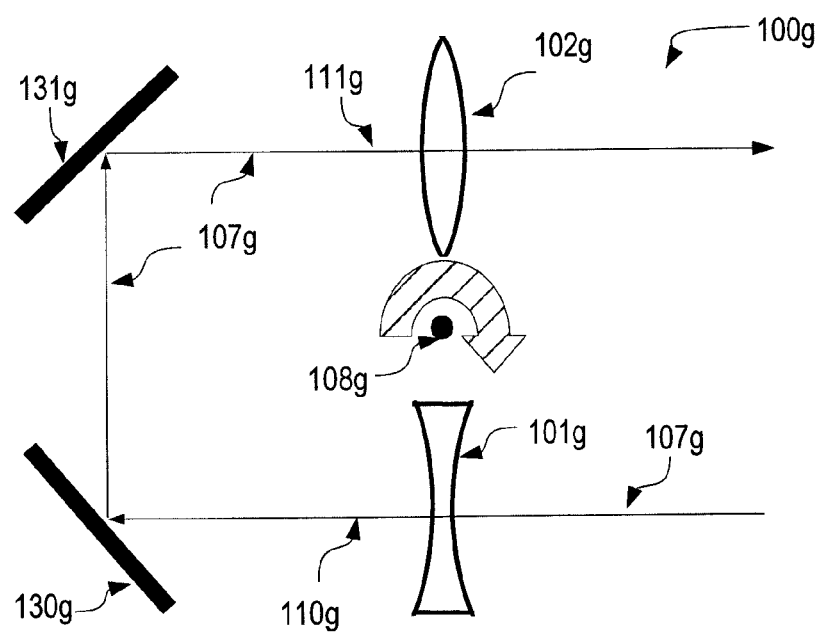
FIG. 8a, both lenses in the optical path (0° position).
Figure 8B:
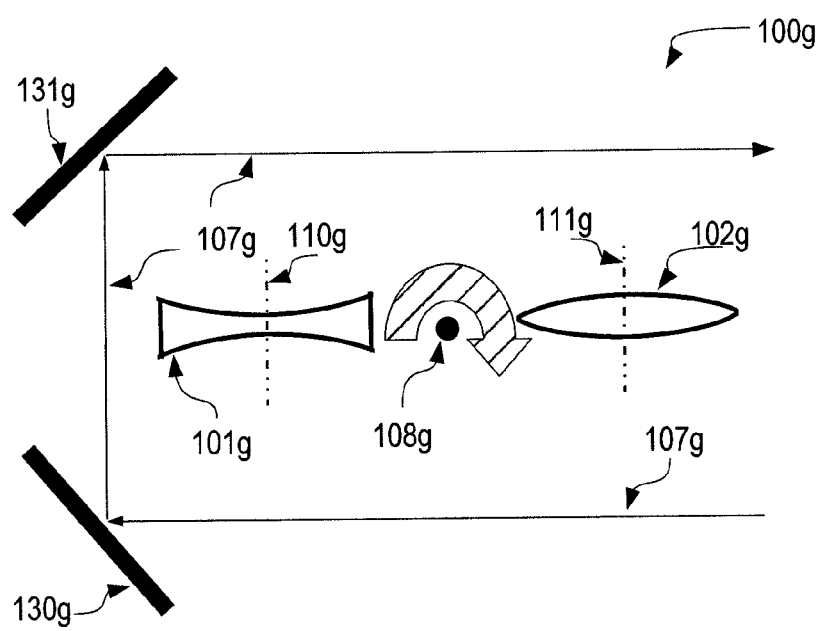
FIG. 8b, none of the lenses in the optical path (90° position).
Figure 8C:
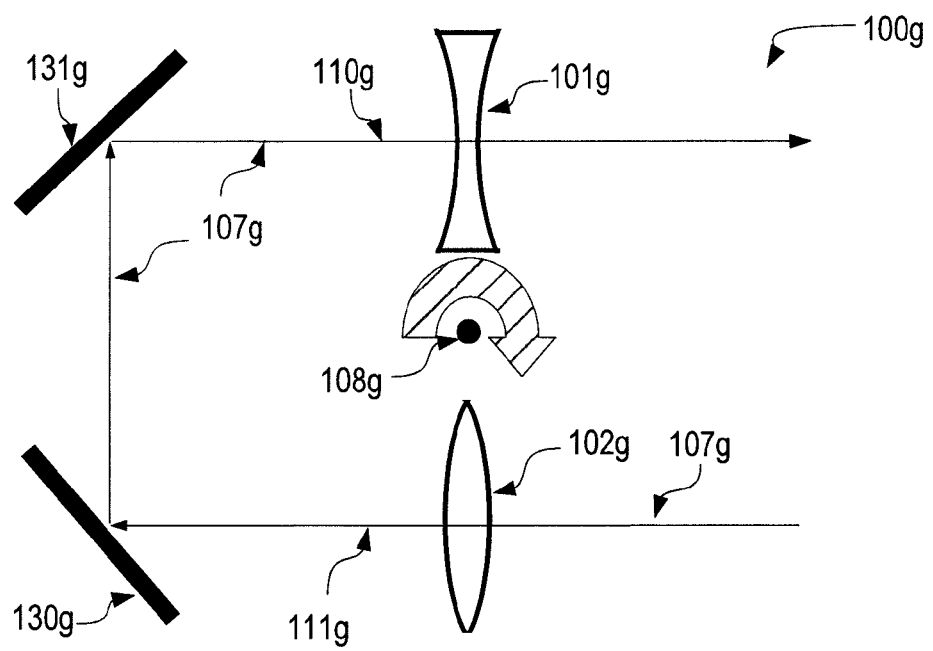
FIG. 8c, both lenses in the optical path, but the other way around than in FIG. 8a (180° position).

FIG. 8 represents a further embodiment of the optical arrangement 100g for varying an imaging ratio and/or a refractive power according to one or more embodiments the invention in discrete steps. Similar as in FIG. 3, the arrangement includes two lenses 101g and 102g. The axis of rotation 108g, however, is perpendicular to the plane of the optical path. The top view onto the plane of the optical path, supplemented by the optical axes 110g and 111g of the optical elements, is shown. The images 8a to c show the different rotary position of the arrangement. In FIG. 8a, both lenses are in the optical path (0° position). In FIG. 8b, none of the lenses are in the optical path: the arrangement from 8a was rotated by 90°. In FIG. 8c, both lenses are again in the optical path, but the other way around as in 8a: the arrangement from 8a was rotated by 180°.

Similar as in FIG. 3a, the optical path in FIG. 8a initially runs through the first lens having a negative refractive power 101g to the first mirror 130g, at which it is deflected by 90°, then further to the second mirror 131g where it is subjected to a second deflection by 90°. The optical path further runs through the second lens 102g with the positive refractive power and leaves the arrangement. The arrangement encompasses an imaging ratio of $V_{ig}$ with $V_{ig} > 1$ herein. It goes without saying that the optical path could also be designed differently, at least one deflection of the optical path is important for one or more embodiments of the invention.

None of the lenses is in the optical path in FIG. 8*b*: the arrangement encompasses an imaging ratio of 1 herein.

In FIG. 8*c*, the optical path initially runs through the first lens having a positive refractive power 102*g* to the first mirror 130*g*, at which it is deflected by 90°, then further to the second mirror 131*g*, where it is subjected to a second deflection by 90°. The optical path further runs through the second lens 101*g* having the negative refractive power and leaves the arrangement. The arrangement encompasses an imaging ratio of $1/V_{ig}$ with $V_{ig}>1$ herein.

On principle, the optical path is thus the same as in FIG. 3, the axis of rotation and the arrangement of the optical elements on the rotary support, however, are different ones.

The lens 101*g* is a lens having a negative refractive power and the lens 102*g* is a lens having a positive refractive power. Similar to FIG. 1 and FIG. 3, this is thus a case without an intermediate image. An equipping with two lenses having a positive refractive power would again also be possible. On the one hand, this would lengthen the optical path considerably. On the other hand, it would have to be ensured that the intermediate image, which is now available, is not generated in the vicinity of the mirrors or the mirrors would have to encompass a very high optical quality, so as not to negatively impact the imaging quality of the arrangement, because all of the surfaces on the mirrors as well as dust are imaged in the vicinity of the intermediate image in a highly accurate manner.

Figure 9:
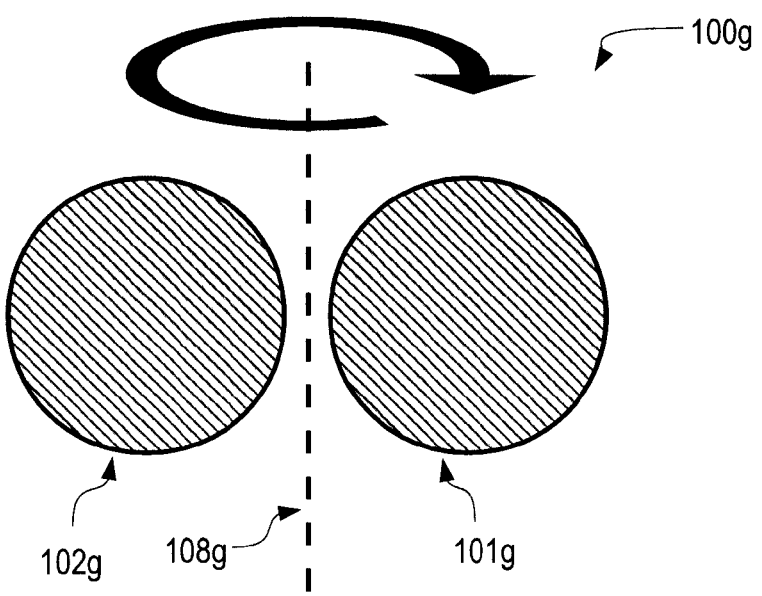
FIG. 9 shows the embodiment of the optical arrangement for varying an imaging ratio and/or a refractive power according to one or more embodiments of the invention in discrete steps comprising two lenses and comprising an axis of rotation perpendicular to the plane of the optical path. View from the front/back in the direction of the optical path, corresponds to cases FIGS. 8a and 8c.
Figure 10A:
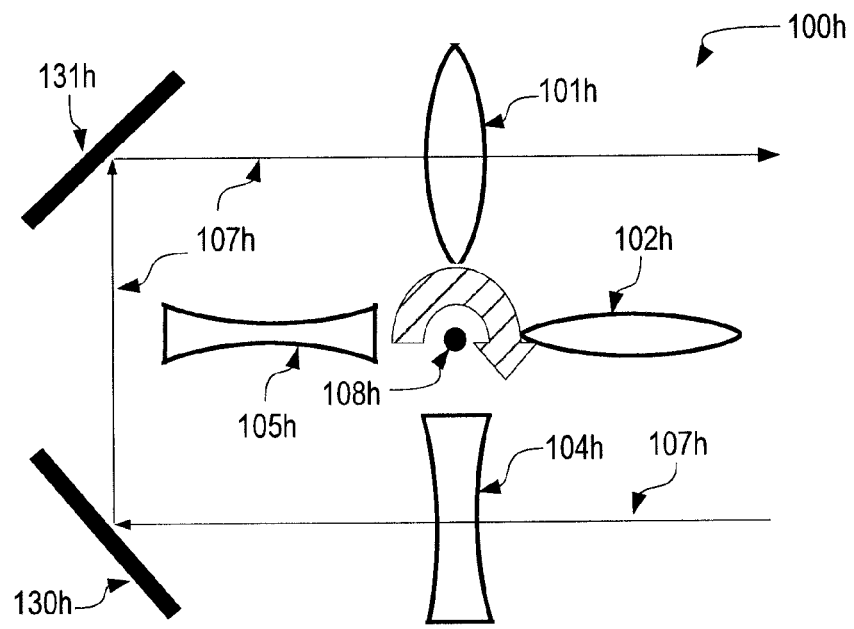
Figure 10B:
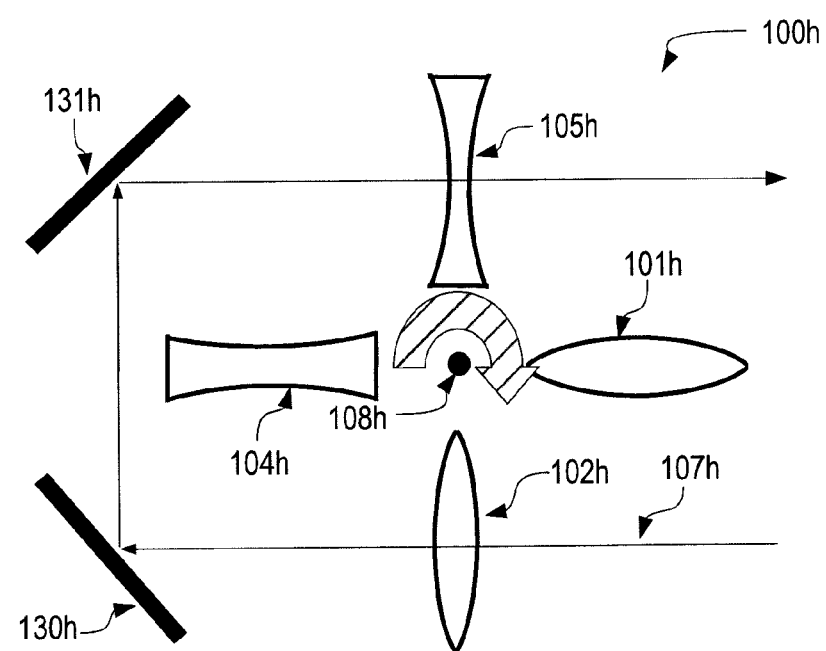
Figure 10C:
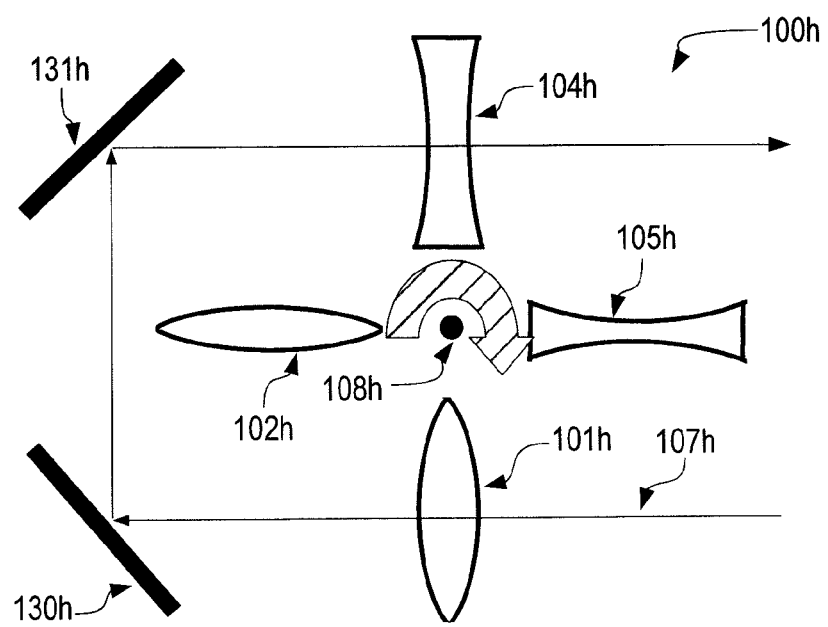
Figure 10D:
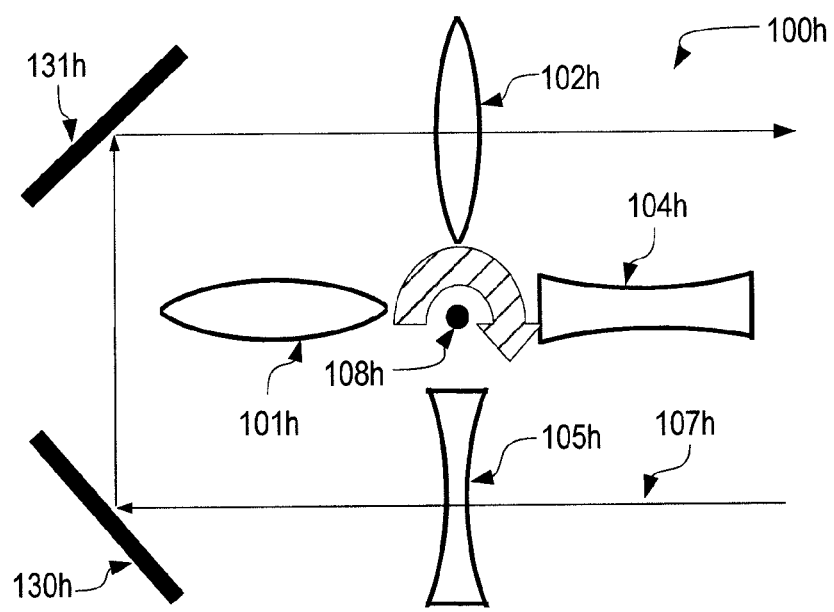

FIG. 9 shows the arrangement, which has been described above, from a different perspective. It can be seen from the front/back in the direction of the optical path. To simplify matters, only lenses 101*g* and 102*g* and the mechanical axis of rotation 108*g* as well as of the rotation direction have been shown.

The large difference to the arrangement from FIG. 1 is that the geometric dimensions of the rotating unit with the lenses, which can be pivoted into, are considerably smaller, namely at least by the factor 2 to 4, similar as in the case of the arrangement from FIG. 3. The overall dimensions are largely determined by the dimensions of the optical elements, here lenses, and not by the distance of these elements along the optical path, as in FIG. 1. The important difference to the arrangement from FIG. 3 is that the axis of rotation in FIG. 8 is perpendicular to the optical path plane. The optical elements, which can be pivoted into/pivoted to, rotate in the beam path plane, which allows for an even more compact design than in FIG. 3 under certain circumstances, provided that the optical paths are long enough. What does not work with this arrangement or what works only with difficulties is the arrangement of the rotational arrangements behind one another, which can be done without any problems with the arrangement from FIG. 3.

This alternative of the solution according to one or more embodiments of the invention is thus particularly compact, light, quick and has a low energy consumption. However, only three different imaging ratios are possible by means of only two optical elements (here: lenses) or groups of such elements and imaginary place holders: 1, $V_{ig}$ and $1/V_{ig}$.

Compared to the arrangement of FIG. 1, the moments (similar to the arrangement from FIG. 3) are smaller by approx. one order of magnitude, on the one hand due to shorter levers, on the other hand due to the weight distribution closer to the axis and of course also due to the use of only one lens pair instead of two.

A possible but not exclusive assembly proposal would be to assemble the lenses on both sides on a very short bar, which connects the two lenses and which rests in the center on the mechanical axis. The lenses could also be assembled directly onto the axis of rotation. Under certain circumstances, however, this would mean that the case, as illustrated in FIG. 8*b*) is not possible, starting at a certain lens thickness and when the optical path completely fills the clear opening of at least one lens and only two different imaging ratios would be possible: $V_{ig}$ and $1/V_{ig}$, similar to FIGS. 3 and 4.

The replacement of the imaginary place holders in FIG. 8 with two lenses leads to the arrangement 100*h* from FIG. 10 comprising four lenses 101*h*, 102*h*, 104*h* and 105*h* and comprising the mechanical axis of rotation 108*h* perpendicular to the plane of the optical path 107*h*. The top view onto the plane of the optical path 107*h*, also spread out by the optical axes of the optical elements, is shown. FIGS. 10*a* to 10*d* show the different rotational positions of the arrangement. In FIG. 10*a*, the first lens pair of the lens having a positive refractive power 101*h* and of the lens having a negative refractive power 104*h* is in the optical path (0° position). The second lens pair of the lens having a positive refractive power 102*h* and of the lens having a negative refractive power 105*h* is outside of the optical path. In FIG. 10*b*, the first lens pair of the lens having a positive refractive power 101*h* and of the lens having a negative refractive power 104*h* are outside of the optical path (90° position). The second lens pair of the lens having a positive refractive power 102*h* and of the lens having a negative refractive power 105*h* is in the optical path. In FIG. 10*c*, the first lens pair 101*h* and 104*h* is again in the optical path, however, the other way around than in FIG. 10*a* (180° position). The second lens pair from lens 102*h* and 105*h* are outside of the optical path. In FIG. 10*d*, the first lens pair of the lens having a positive refractive power 101*h* and of the lens having a negative refractive power 104*h* are outside of the optical path (270° position). The second lens pair of the lens having a positive refractive power 102*h* and of the lens having a negative refractive power 105*h* is in the optical path, however the other way around than in FIG. 10*c*.

The solution, which is only slightly more complex than the solution in FIG. 8, offers four different imaging ratios: $V_{ih}$, $V_{jh}$, $1/V_{ih}$ and $1/V_{jh}$ with four optical elements or element groups (wherein the two free spaces from FIG. 8 have been filled with lenses).

A possible assembly proposal, which is one of the simplest, but again not an exclusive one, would be herein to assemble the lenses on a cross or on two crossed bars, which connect the lenses. The cross or the crossed bars would rest in the center on the mechanical axis. The lens distance corresponds to that of FIG. 8.

Even though due to the four lenses instead of two, the moments are larger than in FIG. 8, the radial weight distribution and the lever length are the same. The moments are thus up to one order of magnitude smaller than in the classic arrangement from FIG. 1.

In the case of a slightly larger distance of the lenses from the axis of rotation, an arrangement with 6 lenses would also be possible. The advantage in the dimensions as compared to the classic arrangement from FIG. 1, however, would no longer be as large as in the other afore-described cases. Corresponding illustrations and a detailed description is thus not necessary. The derivation, however, is very simple for the person of skill in the art.

A further difference between the arrangement according to FIG. 1 and the arrangements according to FIGS. 3 to 10 lies in the direction of the light beams when leaving the arrangement. While this direction in the case of the arrangement according to FIG. 1 is the same as when entering the arrangement, it is precisely the opposite in the case of the arrangements according to FIGS. 3 to 10, but can be arbitrary due to the deflection within the arrangement.

Figure 11:
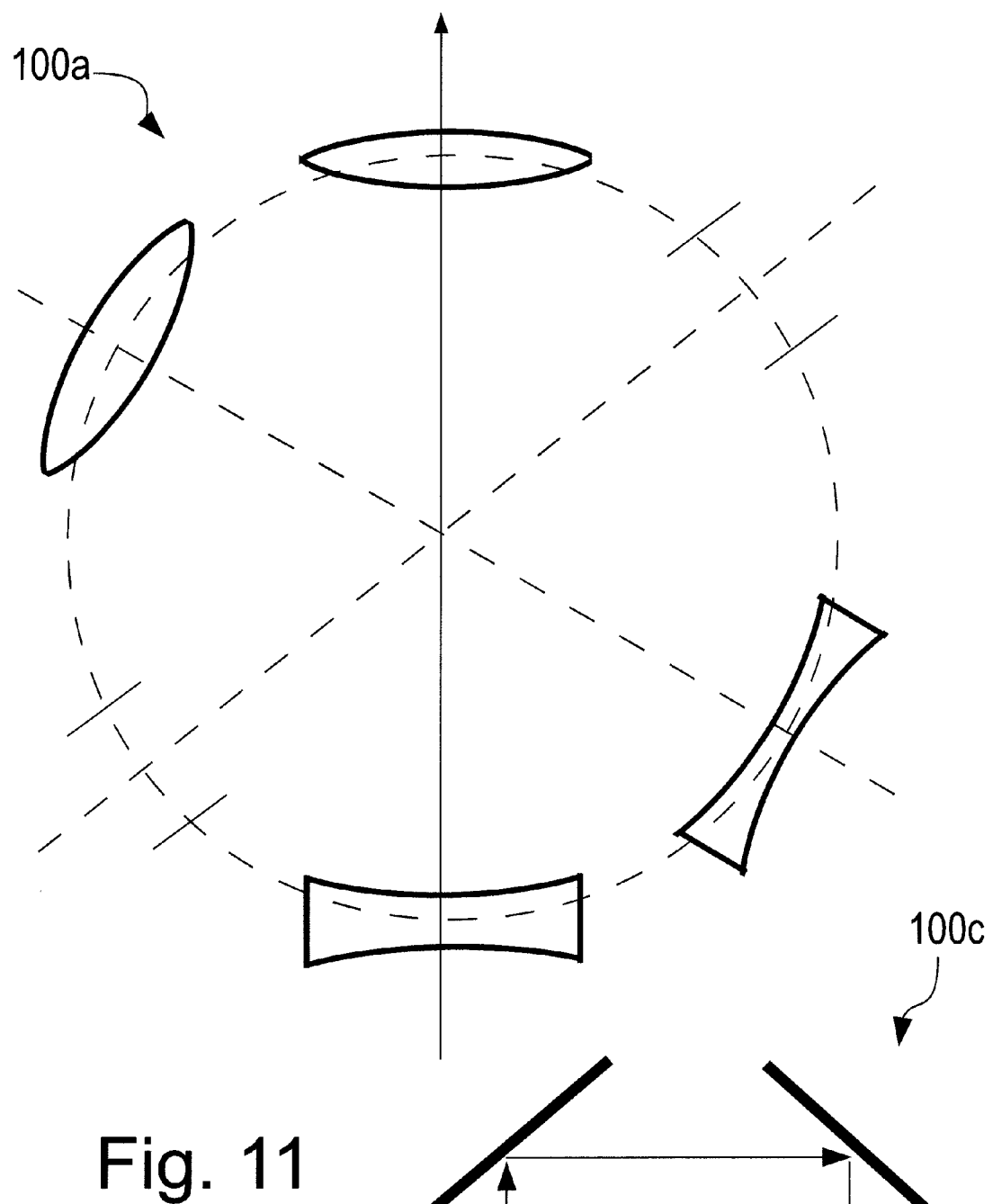
FIG. 11 shows a direct size comparison of a common optical arrangement for varying an imaging ratio and/or a refractive power in discrete steps according to FIG. 1 with the arrangement according to one or more embodiments of the invention in accordance with FIG. 3.

A direct size comparison of a common optical arrangement for varying an imaging ratio and/or a refractive power in discrete steps according to FIG. 1 by means of the arrangement according to one or more embodiments of the invention in accordance with FIG. 3 is shown in FIG. 11. It can be seen immediately that the reduction of the linear dimensions by a factor 2 is easily possible, even more with some effort. The reduction in the surface can reach one order of magnitude. The same applies approximately for the volume, because the expansion in the third dimension is substantially given by the dimensions of the optical elements and they are substantially equal in all applications.

The moments of the arrangements have already been discussed in parts. In a direct comparison, the contributions of the dimensions and of the weight distribution becomes clear. The weight distribution in the arrangement according to FIG. 1, which is extremely far away from the axis, and the weight distribution of the arrangement according to one of FIGS. 3 to 10, which is close to the axis, is particularly clear.

The paths, on which the optical elements are moved, are considerably smaller in the arrangements according to FIGS. 3 to 10 (above factor 2 for the lens centers). This reduces the energy expenditure and increases the speed of the arrangement. Due to the small moments, the energy expenditure is reduced even further and even more clearly and the speed is increased even further.

Figure 12:
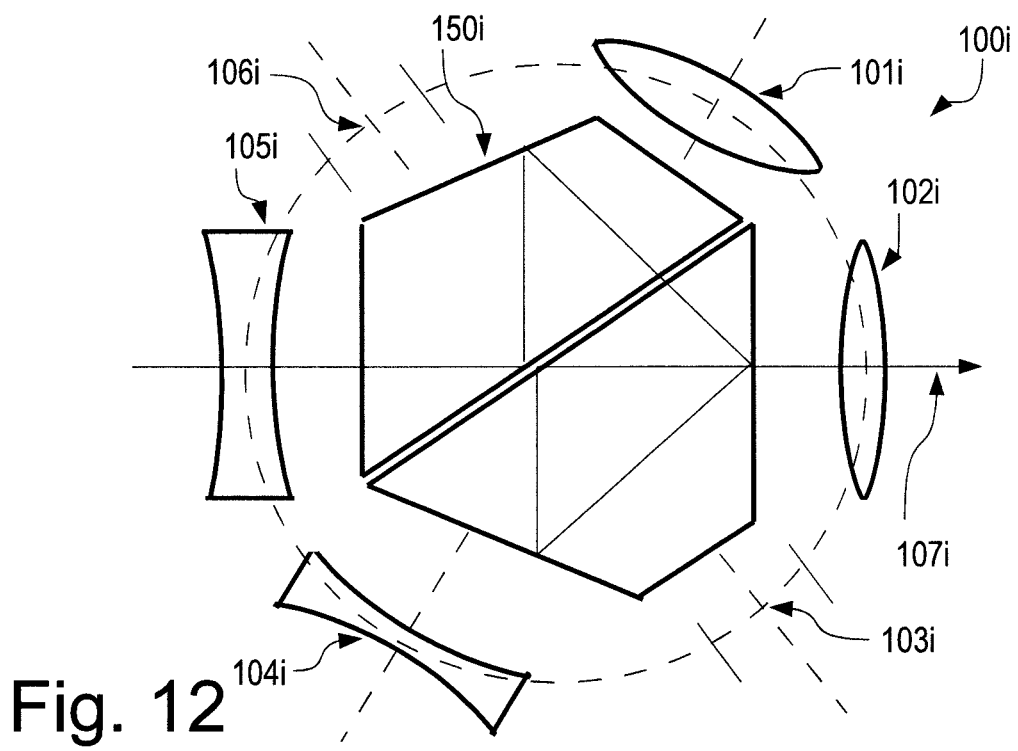
FIG. 12 shows an optical arrangement for varying an imaging ratio and/or a refractive power in discrete steps comprising a Schmidt-Pechan prism for combining the optical path located on the inside.
Figure 13:
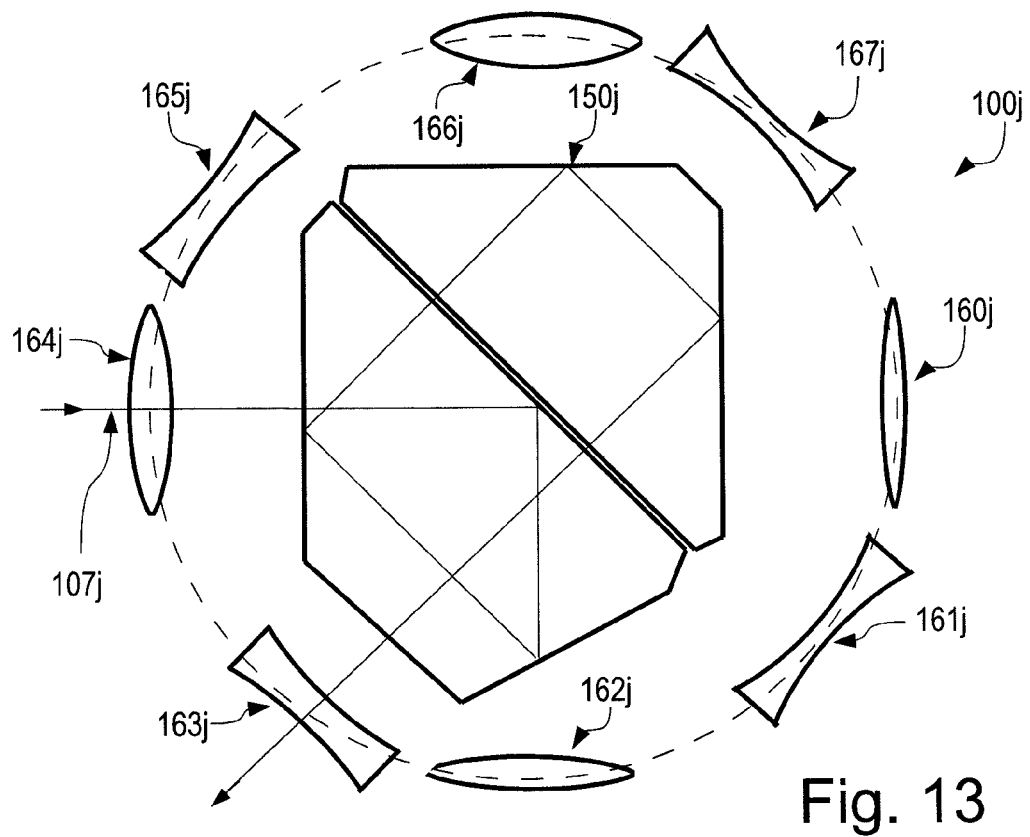
FIG. 13 shows an optical arrangement for varying an imaging ratio and/or a refractive power in discrete steps comprising a further prism arrangement for combining the optical path located on the inside.

FIG. 12 illustrates a further embodiment 100$i$ of an optical arrangement for varying an imaging ratio and/or a refractive power in discrete steps. Even though the basic arrangement from FIG. 1 remains, the dimensions become smaller up to a factor 3 in response to the same optical path, due to the use of a Schmidt-Pechan prism 150$i$ for combining the optical path located on the inside. This embodiment is not limited to the use of the Schmidt-Pechan prism. Other forms are also suitable for the combination of the optical path. FIG. 13 thus shows a further embodiment 100$j$ of an optical arrangement for varying an imaging ratio and/or a refractive power in discrete steps with a further prism arrangement 150$j$ for combining the optical path located on the inside. Similar to the arrangements according to FIGS. 3 to 10, the direction of the light beams when leaving the arrangement does not point in the original direction, but 45° opposite to the direction of entry. Further arrangements comprising one or a plurality of deflections within the optical arrangement by means of mirrors, prisms or other optical deflecting elements are also possible.

The advantages in the dimensions can be compared to those of the applications from FIGS. 3 to 10, but the prism considerably increases the weight of the arrangement, even if this weight is not moved. The linear dimensions are smaller by a factor of approx. 3, surfaces and volumes by about one order of magnitude. In the case of the moments, the advantage is limited to a factor of approx. 3, because the weight distribution remains as in the arrangement of FIG. 1.

The arrangements from illustrations 12 and 13 allow for considerably longer optical paths than in the case without the combination of the optical path in the same or smaller volume and the danger of optical imaging errors is thus reduced. This becomes particularly interesting in the case of combinations with arrangements for continuously varying an imaging ratio and/or a refractive power, which will be illustrated below.

Figure 14:
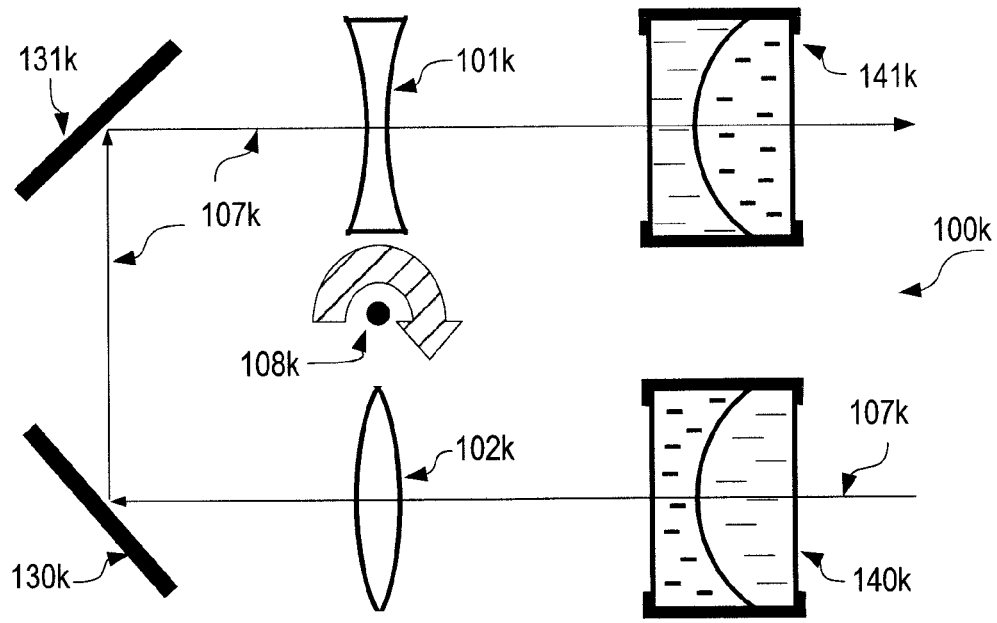
FIG. 14 shows a further embodiment of the optical arrangement for varying an imaging ratio and/or a refractive power according to one or more embodiments of the invention in discrete steps comprising two lenses and comprising the axis of rotation perpendicular to the plane of the optical path, supplemented by two lenses having a variable refractive power. Top view onto the plane of the optical path, also spread out by the optical axes of the optical elements.

FIG. 14 shows a further embodiment of the optical arrangement 100$k$ for varying an imaging ratio and/or a refractive power according to one or more embodiments of the invention in discrete steps comprising two lenses 101$k$ and 102$k$ and comprising the axis of rotation 108$h$ perpendicular to the plane of the optical path, comparable with the arrangement from FIG. 8, supplemented by two lenses having a variable refractive power 140$k$ and 141. The top view onto the plane of the optical path, spread out by the optical axis 107$k$ of the arrangement is illustrated. By adding lenses having a variable refractive power, which form an optical arrangement for continuously varying an imaging ratio and/or a refractive power, an optical arrangement for virtually continually varying an imaging ratio and/or a refractive power across large ranges is created. The discrete changes account for the large dynamic, which, however, comprises only a few steps. The at least two lenses having a variable refractive power allow for the filling of the intermediate ranges and thus require only a small dynamic range, which is advantageous for the optical quality of the arrangement. The lenses having a variable refractive power are arranged at the entry and at the exit of the original optical arrangement for varying an imaging ratio and/or a refractive power in discrete steps according to FIG. 8. Several advantages are associated with this position of the lenses having a variable refractive power. For instance, they can be controlled less strongly to attain the same effect as if they had been arranged within the original optical arrangement for varying an imaging ratio and/or a refractive power in discrete steps according to FIG. 8 or if they had been positioned at a small distance from one another on one side of this arrangement, even though these positions are also possible and sometimes sensible as well. The less strong control of the lenses having a variable refractive power leads to less optical errors; less effort is thus required for correcting these errors. Due to the fact that the lenses with the materials, which can be used today, can only be corrected internally to an insufficient extent (2-liquid lenses) or due to the fact that additional lenses must be used (2-liquid lenses and other lenses having a variable refractive power), this is an important aspect in the design of the arrangement. The less strong control of the lenses having a variable refractive power furthermore requires a lower control voltage and also less energy. These are important aspects, in particular in the case of mobile applications.

As an example, 2-liquid lenses, such as by Philips or Varioptic, e.g., have been shown. However, they could have been any lenses having a variable refractive power, which have been developed on the basis of liquid crystals, polymers, gels, a liquid or electroactive polymers, e.g. (Optotune, Holochip, Rhovision, etc.).

Arrangements according to FIG. 10 comprising four lenses, which can be pivoted into, could be combined with lenses having a variable refractive power and also those comprising six lenses, which can be pivoted into.

Figure 15:
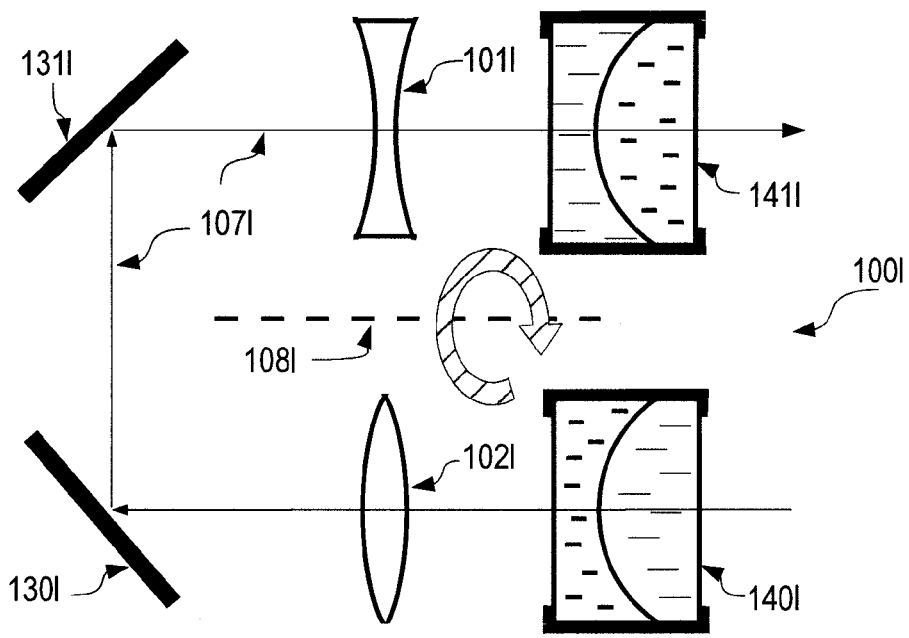
FIG. 15 shows a further embodiment of the optical arrangement for varying an imaging ratio and/or a refractive power according to one or more embodiments of the invention in discrete steps comprising two lenses and comprising an axis of rotation parallel to the optical axes of the optical elements, supplemented by two lenses having a variable refractive power. Top view onto the plane of the optical path, also spread out by the optical axes of the optical elements.

FIG. 15 shows a further embodiment of the optical arrangement 100$l$ for varying an imaging ratio and/or a refractive power in discrete steps comprising two lenses 101$l$ and 102$l$ and comprising an axis of rotation 108$l$, which, however, is located in the plane of the optical path, comparable to the arrangement from FIG. 3, supplemented by two lenses having a variable refractive power 140$l$ and 141$l$. The top view onto the plane of the optical path, spread out by the optical axis 107$l$ of the arrangement is illustrated. All of the further remarks from the description of FIG. 14 also apply here.

Arrangements comprising four lenses, which can be pivoted into, could also be combined with lenses having a variable refractive power and with all others, which have been introduced in combination with FIGS. 3 to 7, e.g.

Figure 16:
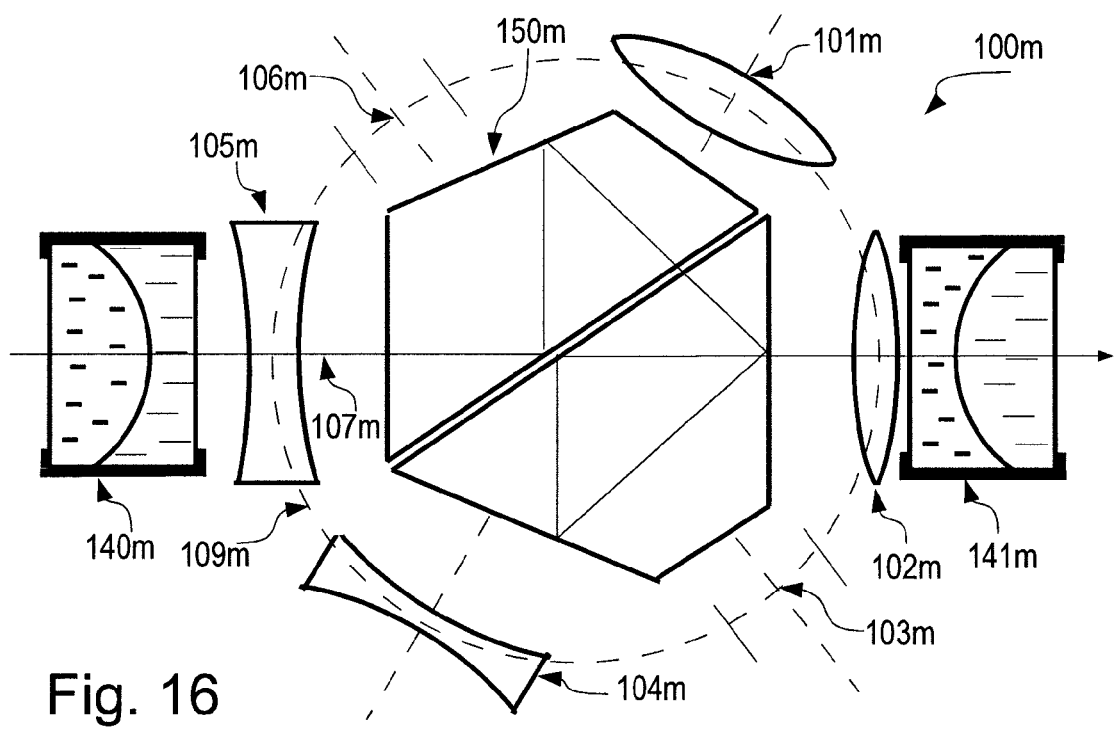
FIG. 16 shows a combination of the optical arrangement for varying an imaging ratio and/or a refractive power in discrete steps with combination of the optical path located on the inside and lenses having a variable refractive power.

A combination 100m of lenses having a variable refractive power comprising the discrete optical arrangement for varying an imaging ratio and/or a refractive power in discrete steps with the combination of the optical path by means of a prism in the interior of the arrangement is shown in FIG. 16. This arrangement encompasses virtually all of the advantages of the arrangements from FIGS. 14 and 15. However, the slightly larger moments and the slightly higher weight are somewhat disadvantageous.

The lenses having a variable refractive power from FIG. 16 could be replaced by any optical arrangement for continuously varying an imaging ratio and/or a refractive power, e.g. from FIG. 2. A combination of the arrangements from FIGS. 12 and 2 would be present. A pure combination of the arrangements from FIG. 1 and FIG. 2, e.g., similar to the arrangements from FIGS. 14 to 16, could also be controlled in a virtually continuous process. In both combinations, the arrangement from FIG. 2 could be located upstream of or downstream from the arrangement from FIG. 12 or 1, namely directly as well as being spaced apart by means of further optical elements. A further alternative would be a combination with the arrangement according to FIG. 2 within the arrangements according to FIG. 12 or 1, possibly in a reduced form. In this paragraph, the exemplary arrangement from FIG. 2 could be replaced by any optical arrangement for continuously varying an imaging ratio and/or a refractive power, e.g. the one from U.S. Pat. No. 6,853,494, U.S. Pat. No. 7,315,423 or U.S. Pat. No. 5,859,729, the full scope of the disclosure content of which is hereby adopted.

The described combinations with the involvement of the arrangement according to FIG. 2, which is specified as a representative for any optical arrangement for continuously varying an imaging ratio and/or a refractive power, have the advantage herein that they must only encompass a relatively small dynamic range in the imaging ratios, so as to be able to fill the intermediate ranges between the discrete values of the imaging ratios. This means that, on the one hand, these arrangements can be designed in a relatively compact manner. On the other hand, the lenses must only be moved across relatively small distances, which allows for the use of piezoelectric or other actuators, which are quick in response to small deflections.

The optical elements, which can be pivoted into and/or pivoted to, in the described arrangements are typically arranged in pairs substantially equidistant about the mechanical axis, in particular they are all typically arranged substantially equidistant about the mechanical axis. In the event that the weight distribution, however, becomes too irregular due to different lens sizes and lens weights, the unbalance could be substantially eliminated by varying the distance from the axis and/or other measures, which would have a positive effect on the energy consumption of the arrangement, the speed and freedom from vibration thereof as well as on the durability thereof. This would take place in a particularly simple manner in the afocal case; however, it would also be possible in all other cases with a little computing and development effort. Under certain circumstances, this type of elimination of the unbalance would get by without additional weights, which would have a positive effect on the weight of the overall arrangement. Several examples with reference to this:

Practical embodiments 100n and 100o of an optical arrangement for varying an imaging ratio and/or a refractive power in discrete steps corresponding to the arrangements 100a and 100f in FIG. 1 and FIG. 7 are shown in FIGS. 17 and 18, respectively. An arrangement 100n, similar to FIG. 1, is depicted in FIG. 17, wherein the size of the lenses in FIG. 17 is adapted to the size of the optical path, as it is actually already common in the state of the art. The advantage of the size adaptation is the savings in material, a lower weight of the arrangement and thus a lower construction effort, overall smaller moments and thus a lower energy demand of the arrangement. However, the lower energy demand of the arrangement is partly qualified again due to the larger imbalance, which is created.

Figure 17A:
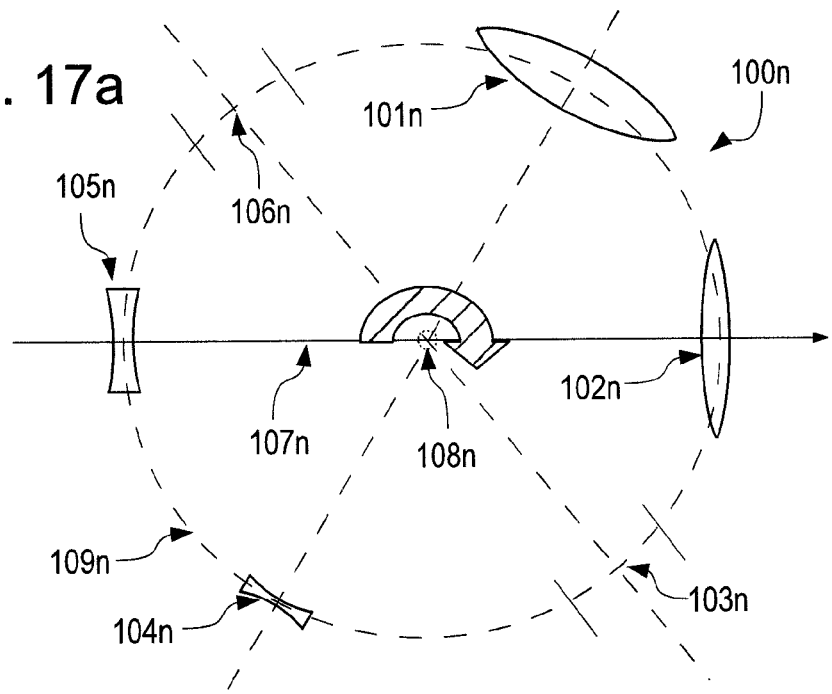
FIG. 17a, state of the art.

The order of the lenses, which is based on the otherwise common order can be seen in FIG. 17a, namely that the imaging ratio stages in response to the rotation of the arrangement increase from bottom to up or decrease from top to bottom in a steady manner, if possible. This is the case in FIG. 17a, except for the change from the third-largest imaging ratio to the fourth-largest imaging ratio and vice versa. This change must be encoded in a suitable manner, it cannot be attained directly by progressive steady rotation of the elements, which can be pivoted into, in the same direction in the desired order.

Figure 17B:
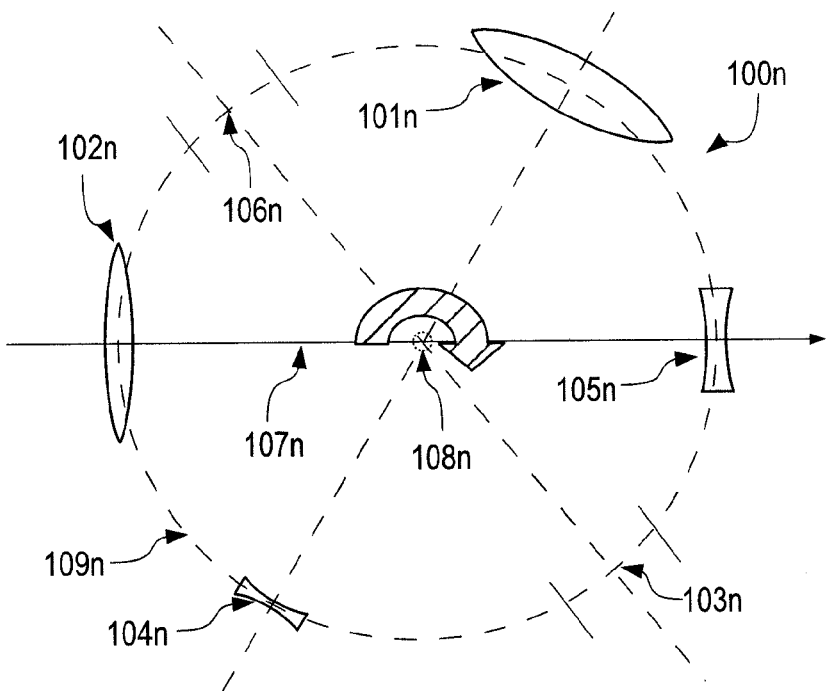
FIG. 17b, smaller unbalance and moment-reduced distribution of the optical elements.

The arrangement according to FIG. 17b requires an even higher encoding effort, because each rotation of the arrangement first controls an imaging ratio of at least two stages. FIG. 17b represents a solution, which is slightly improved with reference to the weight distribution. The heavier lens having a positive refractive power 102n has traded places with the lens having a negative refractive power 105n.

So that the imaging ratio stages at the user interface increase steadily from bottom to top or decrease from top to bottom, as ergonomics require, the movement at the user interface may be recoded electronically or mechanically in a suitable manner and the correct movement of the rotational arrangement is attained through this.

The advantage of the arrangement according to FIG. 17b as compared to the arrangement according to FIG. 17a lies in the smaller imbalance due to the slightly better weight distribution, which causes a lower energy demand. The freedom from imbalance can be optimized even further by suitably selecting the base correction and the residual correction of the optical elements/lenses, which can be pivoted into and/or pivoted to. This is so, because the weight of the residual correction members and the distribution thereof is a parameter, which can be varied suitably. In addition to a suitable material selection, the use of the main correction or overall correction of the residual correction at the smaller component could also be the means of choice.

Figure 17C:
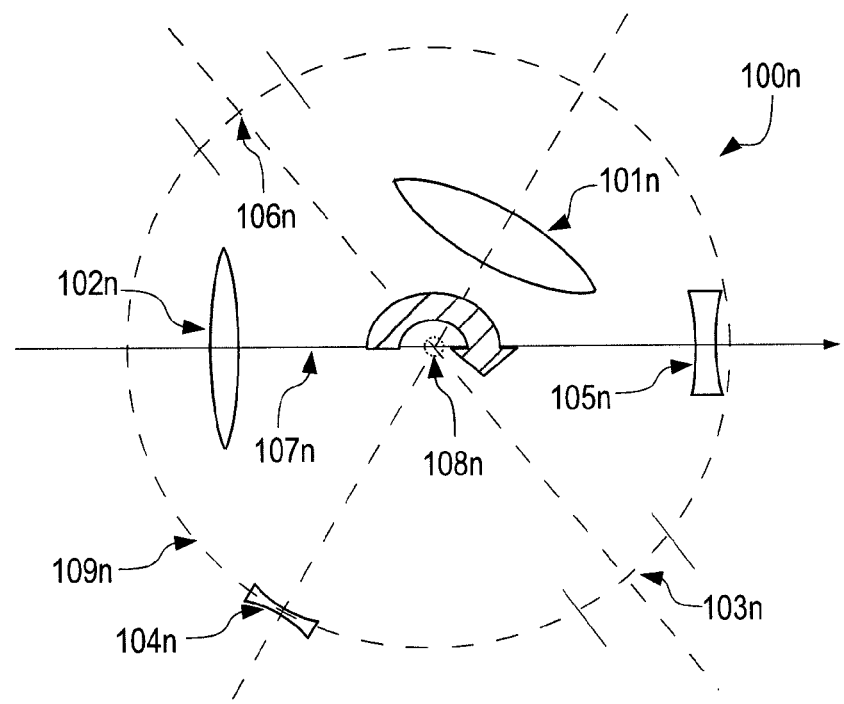
FIG. 17c, improved smaller unbalance and moment-reduced distribution of the optical elements.

As shown in FIG. 17c, the imbalance can be reduced even further in that the heavy lenses are attached so as to be closer to the axis. However, it must be noted that this readily acceptable only in the afocal case. In addition, the optical design must be changed and the lenses must be replaced by other lenses, which are adapted to the smaller distance. The freedom from imbalance then becomes noticeable in a lower energy demand, speed and freedom from vibration, lower demands on the device, which accommodates the arrangement (less robust and heavy). This is a step in the direction of mobile applications.

Figure 18A:
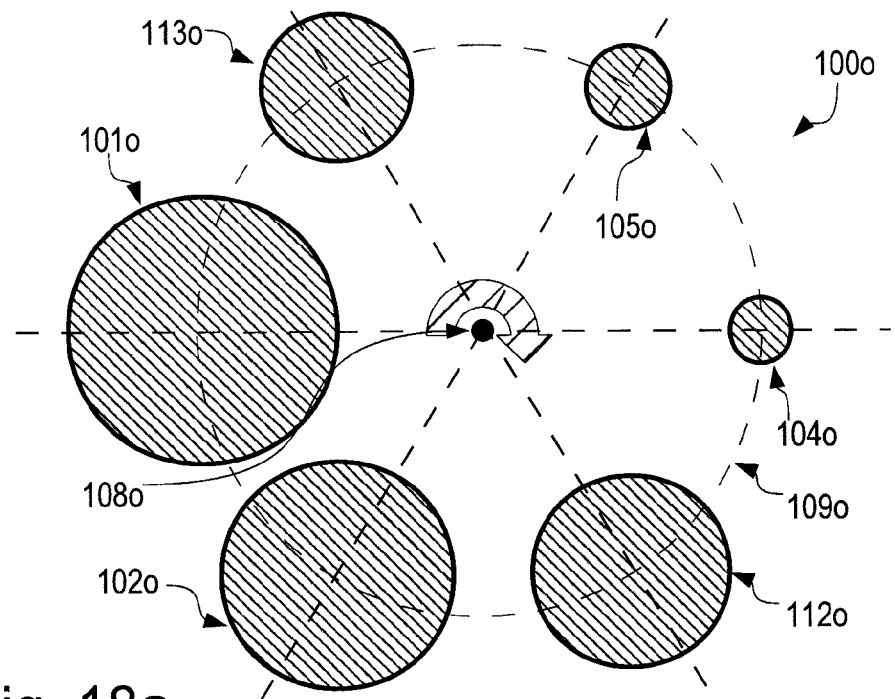
FIG. 18a, weight-reduced lens forms.
Figure 18B:
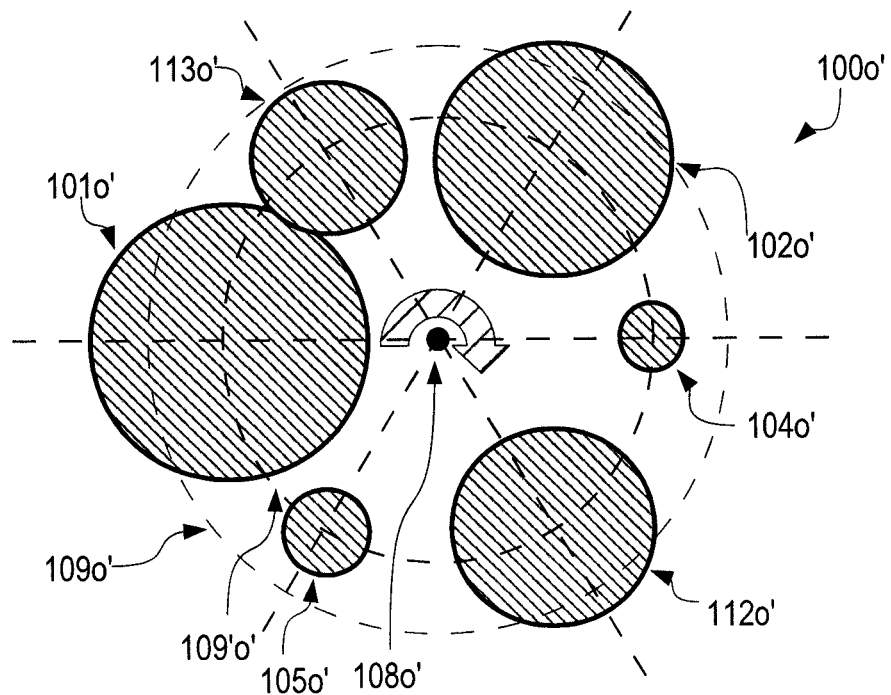
FIG. 18b, smaller unbalance and moment-reduced distribution of the optical elements.
Figure 18C:
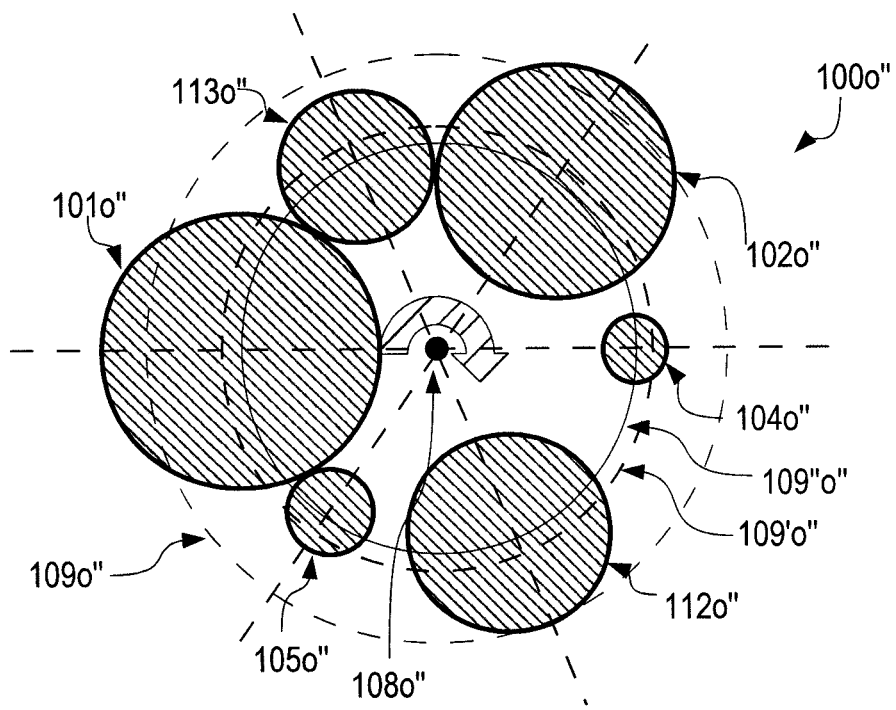
FIG. 18c, improved smaller unbalance and moment-reduced distribution of the optical elements.

Similar to FIG. 17, which has shown improvements of the characteristics of the arrangement from FIG. 1, FIG. 18 shows improvements to the arrangement from FIG. 7. FIG. 18a, in turn, shows an arrangement 100o, based on the arrangement from FIG. 7, in which the size of the lenses is adapted to the size of the optical path. The advantage of the size adaptation is a saving in material, a lower weight of the arrangement and thus a lower construction effort, overall smaller moments and thus a lower energy demand of the arrangement. However, the lower energy demand of the arrangement is partly qualified again due to the larger imbalance, which is created. Due to the smaller lens dimensions, the lens distance from the axis of rotation can instead be reduced. The difference in the length of the optical path can be compensated very easily by means of the mirror distance, so that a new design of the lenses is not necessary. In addition, the resulting difference in the length of the optical path is already relatively small. FIG. 18b shows the arrangement 100o' comprising the smaller lens distance from the axis of rotation, supplemented by a change of place of the lenses 102o and 105o, which, in turn, causes an even smaller lens distance. The lens centers rotate herein on the circular path 109'o' with a radius, which is approx. 25% smaller than that of the circular path 109o in FIG. 18a. The space requirement in the surface as well as in the volume is reduced to barely more than half of the space requirement from the arrangement in FIG. 18a. A further reduction of the space requirement takes place by surrendering the equidistance of the lens centers on the circular path. The lenses 102o" and 113o" in FIG. 18c have further slid away from the lens 101". Through this, all of the lenses can be arranged to be even closer to the axis. The lens centers now rotate on the circular path 109"o" with a radius, which is approx. 33% smaller than in FIG. 18a. The space requirement in the surface as well as in the volume is thus reduced to less than half of the space requirement from the arrangement in FIG. 18a and is as large as in the case of the arrangement shown in FIG. 6 comprising 4 lenses. All of these measures cause a lower energy demand, which becomes apparent mainly in the case of mobile applications. The considerations with reference to the base correction and residual correction of the optical elements/lenses, which can be pivoted into and/or pivoted to, apply accordingly as in the discussion of FIG. 17.

The following table compiles several characteristics of the described arrangements. The number of the discrete imaging ratios and the dynamic of the imaging ratios is specified as a function of the number of the optical elements and/or place holders, which can be pivoted into and/or pivoted to. The part "with analogous detuning" describes combinations of an optical arrangement for varying an imaging ratio and/or a refractive power in discrete steps comprising optical arrangements for continuously varying an imaging ratio and/or a refractive power, e.g. according to FIG. 14, 15 or 16. "Without analogous detuning" applies to optical arrangements for varying an imaging ratio and/or a refractive power in discrete steps alone, e.g. according to FIG. 3 to 10, 12, 13, 17 or 18.

power can already be attained today with a very high quality. Virtually continuous optical arrangements for varying an imaging ratio and/or a refractive power, which are very quick, which encompass a large overall dynamic range with an excellent imaging quality, and which are additionally so small that they can be used in mobile devices, can thus already be realized today. The low energy demand of the arrangements also speaks for mobile applications.

It must also be noted that the table provides information for simple arrangements. In the event that the arrangements illustrated in FIGS. 5 and 6 were arranged downstream from one another in the arrangement according to FIG. 15, the number of the discrete imaging ratios would increase to 12, which would result in an overall dynamic in the imaging ratio of clearly beyond 10, already with M=1.3 and far beyond 20 with M=1.5, both in the case with the analogous detuning. These are numbers, which can be realized immediately by means of one or more embodiments of the instant invention, but which will most likely still remain unattainable for many years in response to the direct use of optical elements having a variable refractive power.

Finally, several general and helpful specific characteristics and applications shall be mentioned.

The arrangement according to one or more embodiments of the invention can thus be operated in the visible and/or in the IR and/or in the UV range. In accordance with one or more embodiments, the optical elements, which are used in transmission, may be anti-reflection coated, so as to avoid reflection losses. In accordance with one or more embodiments of the present invention, these optical elements can have an inner transparency of greater than 90%, greater than 95%, greater than 97%, or greater than 98%, so as to keep absorption losses low.

For automation purposes, for reasons of ergonomics and safety, the optical elements or also the entire arrangement could include a device, by means of which they can be identified by means of the device, which includes the arrangement. Looking ahead, the identifying device could contain RFID technology, but could also use simple mechanical or electrical or magnetic encodings.

When using lenses having a variable refractive power comprising at least two liquids, the liquids should substantially encompass the same density, so as to avoid gravity effects at the interfaces.

| Arrangement | | Number of discrete | Dynamic imaging ratios | | | | | |
|---|---|---|---|---|---|---|---|---|
| | Place | imaging | Without analogous detuning | | | With analogous detuning | | |
| Lenses | holders | ratios | M' = 1.3 | M' = 1.4 | M' = 1.5 | M' = 1.3 | M' = 1.4 | M' = 1.5 |
| 6 | 0 | 6 | 3.71 | 5.38 | 7.59 | 4.80 | 7.53 | 11.39 |
| 4 | 2 | 5 | 2.86 | 3.84 | 5.06 | 3.71 | 5.38 | 7.59 |
| 4 | 0 | 4 | 2.20 | 2.74 | 3.38 | 2.86 | 3.84 | 5.06 |
| 2 | 2 | 3 | 1.69 | 1.96 | 2.25 | 2.20 | 2.74 | 3.38 |
| 2 | 0 | 2 | 1.30 | 1.40 | 1.5 | 1.69 | 1.96 | 2.25 |

Conditions: the quotient $M'=M_{ij}$, of the adjacent imaging ratios $V_i$ and $V_j$ is approximately the same for all imaging ratios and the dynamic of the analogous detuning of the imaging ratio M is approximately equal to M'. In the event that M>M', the three right-hand columns are to be considered as rather being a minimum value.

It must furthermore be noted that a dynamic M=1.3 comprising two lenses having a variable refractive power or M=1.5 comprising four lenses having a variable refractive Lenses having a variable refractive power comprising liquid crystals or at least two liquids, may be used for optical path diameters of below 10 mm, because they no longer supply any satisfactory results in the case of these clear openings, at the latest. In the case of the lenses comprising liquid crystals, this is caused by insufficient refractive index changes across larger distances and by instabilities at the interfaces between the liquids in the case of the lenses comprising at least two liquids.

Due to the fact that it was not yet possible to reasonably miniaturize the lenses having a variable refractive power with a liquid, with polymers or electro polymers, they may be used for optical path diameters of greater than 5 mm.

For most of the applications in the field of consumer instruments, the time constant of the lenses having a variable refractive power in response to refractive power variation should be smaller than 0.2 S. The time constant can sometimes also be higher in response to reduction in ergonomics.

The lenses having a variable refractive power, in particular those according to the electro-wetting principle, should have a centering device, so that the optical axis of the arrangement is spatially fixed. Two forms of the centering device have proven until now: the conical form of the container, which accommodates the liquids, by Varioptic and the small cylindrical tube by Philips.

In accordance with one or more embodiments of the present disclosure, the demands on the consumer instruments require for the temperature range for the use, in particular of the lenses having a variable refractive power, to be at least 5° C. to 30° C. Further, in accordance with one or more embodiments the temperature may be at least −5° C. to 40° C., or in a range of −15° C. to 50° C., or further, in a range of at least −20° C. to 60° C. In accordance with one or more embodiments, the temperature range for the storage may be at least 0° C. to 35° C., or in a range of at least −10° C. to 45° C., or in a range of at least −20° C. to 60° C., or in a range of at least −40° C. to 85° C.

In accordance with one or more embodiments described herein, the lenses having a variable refractive power are to encompass a refractive power variation of at least 5 diopters. Alternatively, in accordance with one or more embodiments, the variation may be at least 10 diopters, or at least 15 diopters, or at least 18 diopters.

In accordance with one or more embodiments of the present invention, for the use in consumer instruments, the power consumption of the lenses having a variable refractive power per lens may be less than 5 mW. In accordance with one or more embodiments, the power consumption may be less than 1 mW, or may be less than 0.5 mW, or may be less than 0.2 mW. At this point, this demand is optimally fulfilled only by the lenses of Varioptic.

The speed of most of the lenses having a variable refractive power makes the use thereof in the context of an anti-jitter, but also of an autofocus device advisable. The application thereof is far superior to the conventional mechanical solutions.

The arrangement, which can be used in a microscope, in a microscope worn on the head, or in a microscope for surgical procedures, may use the first or the second prism, which is already present and which is mirrored on the image-side, or the double mirror downstream from the lens.

In accordance with one or more embodiments of the invention, a device, which includes the described arrangement according to one or more embodiments the invention, can include a device, which can create and/or display and/or superimpose and/or store a digitally enlarged or reduced image or image sequence of the object, which is imaged by means of the arrangement, and/or can store parameters for such an image or image sequence. Commonly, a digital enlargement or reduction thereby only refers to an enlargement or reduction of the pixel size of a recording by means of a digital camera. The edges, which were created in response to a reduction, can be filled with the last pixels in front of the edge, so as to maintain the image format. The display can take place on the viewing screen of a camera or of a monitor, for example. The superimposition can be carried out in an optical monitoring path of a microscope, in particular of a microscope for surgical procedures, for example. The storage to any storage medium can be carried out in an instrument-internal or external manner via a wired or a wireless connection.

The display or the superimposition of a digitally enlarged or reduced image or of an image sequence of the object, which is imaged by means of the arrangement, makes sense, e.g. in response to the switchover between the different values of the arrangement for varying an imaging ratio or of a refractive power in discrete steps when the overall arrangement is tuned by means of the arrangement for continuously varying an imaging ratio or a refractive power. The missing image or the image or image sequence, which is distorted by the switching process, is replaced by digitally adapted images. The size of the adaptation can thereby be chosen in keeping with the detuning speed of the arrangement, so that the images, which are not digitally adapted, are displayed again after the switching process, in a size, which follows seamlessly to the size of the last digitally adapted images and the switching process is not perceived at all or almost not at all. The digitally adapted images are thereby continuously enlarged or reduced, depending on the switch-over or detuning direction and thus include different stages of the digital enlargement or reduction. In the event that a camera pivot is carried out thereby, the image content must also be adapted in addition to the size, which takes place in a "straight forward" manner and which is not a problem for a person of ordinary skill in the art. The same considerations also apply for the storage of the image information, such as the image parameters. In accordance with one or more embodiments, the digital enlargement or reduction is thereby smaller than, equal to or at most 30% larger than the quotient from the adjacent discrete values of the imaging ratios of the arrangement for varying an imaging ratio or a refractive power in discrete steps.

Further, in accordance with one or more embodiments of the invention, a device, which includes an optical arrangement for varying an imaging ratio or a refractive power in discrete steps, can be able to represent all of the intermediate values between the adjacent discrete values of the imaging ratios of the arrangement for varying an imaging ratio or a refractive power in discrete steps with the help of the technology alone, which has just been presented. An optical arrangement for continuously varying an imaging ratio or a refractive power is not necessary. The digital size adaption then takes place as a function of the manual adjustment at the device or as a function of a control signal. Due to the fact that the adjacent discrete values of the imaging ratios of the arrangement for varying an imaging ratio or a refractive power in discrete steps are relatively close to one another, e.g. apart from one another by a factor of 1.3, the effect of the digital size adaptation on the image quality can only be perceived minimally in this case and can barely be perceived by the observer contrary to the digital size adaptation in some consumer instruments, where the digital size adaptation can reach a factor of 4 or 10 in response to a correspondingly unacceptable image quality.

In the case of commercial utilization, one or more embodiments of the invention suggest the idea of establishing a product family, the family members of which differ from one another only by the presence of the optical elements having a variable refractive power and/or an optical arrangement for continuously varying an imaging ratio or a refractive power and/or the control thereof and/or the possibility of a digital size adaptation of an imaged object.

However, "only" refers to the optical design, so that the family members (partly) encompass the same optical elements and this set of optical elements is supplemented by optical elements having a variable refractive power. It goes without saying that other characteristics remain unaffected by this and color of the instrument, mechanical design, other design, etc., e.g., can indeed vary.

It must furthermore be clarified that it goes without saying that the above-mentioned digital enlargement or reduction for generating intermediate values in the imaging ratios (enlargement stages) of an optical arrangement for varying an imaging ratio and/or a refractive power in discrete steps can indeed be chosen to be greater than 30%, e.g. when a deterioration of the image quality is acceptable.

Furthermore, not only the real intermediate values between the different imaging ratios become possible by means of the digital enlargement and/or reduction, but also values outside of the maximum value and/or possibly also of the minimum value for an imaging value, e.g. above the maximum value and/or below the minimum value. In accordance with one or more embodiments, these will thereby be values above the maximum value of the imaging ratio. The dynamic of such an optical arrangement for varying an imaging ratio and/or a refractive power in discrete steps is therewith as high as in the case of "with analogous detuning" in the above table, thus, e.g. 7.59 in the case of a quotient of the adjacent imaging ratios of 1.5 and a simple arrangement comprising four lenses and two place holders, e.g. according to FIG. 1 or 5.06 in the case of a quotient of the adjacent imaging ratios of 1.5 and a simple arrangement comprising four lenses according to FIG. 6 in combination with FIG. 3.

A simple method for controlling an optical arrangement for varying an imaging ratio and/or a refractive power including at least two discrete imaging ratios and the possibility of a digital enlargement and/or a digital reduction could be as follows: a first discrete imaging ratio of the arrangement is controlled or left (left, in the event that the arrangement is already in a state, which supplies the first imaging ratio) and the desired digital enlargement or reduction is set. A desired (overall) imaging ratio would thus have been set. However, in the event that a detuning is to take place across a range of imaging ratios, the digital enlargement or reduction is detuned subsequently. Subsequently, a switch-over can be made into another discrete imaging ratio and the digital enlargement or reduction can be continued so as to cover a larger range of imaging ratios.

A series arrangement of a plurality of optical arrangements for varying an imaging ratio and/or a refractive power will take place in a carefully considered manner. To simplify matters, a series arrangement of a plurality of complete optical arrangements, such as in FIGS. 1-10, e.g., and not only of the rotational arrangements as from FIGS. 3-10, 14 and/or 15 is suggested, because the individual parts are uncoupled from one another through this and can be computed well. Otherwise, the computation can turn into a highly challenging task.

It is once again pointed out expressly that the mentioned and claimed combinations of a plurality of, at least two optical arrangements for varying an imaging ratio and/or a refractive power do not only refer to the new systems according to one or more embodiments of the invention, which are introduced herein, but also to the conventional systems, e.g. from FIG. 1 (wherein the number of lenses could also be two or six instead of four herein) and to FIG. 2. The surprising fact about these combinations is the fact that the number of enlargement stages (imaging ratios) of the overall arrangement is not the sum of the individual numbers, but the product thereof, and that many more enlargement stages are thus attained by means of a much smaller space requirement. Example: two arrangements according to FIG. 1, in each case comprising four lenses and two place holders provide 25 enlargement stages instead of 10, for instance, within one optical path. The second arrangement comprising only four lenses and two place holders is thus responsible for 20 more stages. Each arrangement alone thereby generates only five imaging ratios. Similar to two arrangements according to FIG. 1, but in each case comprising two lenses instead of four, and two place holders, provide for nine enlargement stages instead of six as combination within an optical path, so that the second arrangement comprising only two lenses is responsible for six more stages. It should also be mentioned that the parts of the combination must not necessarily be located in one plane, but can indeed be perpendicular to one another. The combinations are also interesting, because they provide for a relatively high number of imaging ratios for each claimed volume and can thus be the first choice when a high number of imaging ratios is required.

The above-specified moment of surprise arises, because with an arrangement according to FIG. 1, e.g., the number of imaging ratios is additively comprised of the numbers of the lens pairs times two, possibly plus one for an available place holder pair. One tends to believe that an additional lens pair in a further arrangement increases the number of the imaging ratios by two in the same manner as in the same arrangement, instead of doubling the number of the imaging ratios, which would be correct.

It must further be noted that with reference to space savings, embodiments of the instant invention makes sense, in particular when the distance of the adjacent optical elements, in particular of the optical elements, which can be pivoted into and/or pivoted to and/or switched into and/or switched to and/or inserted into is small relative to one another. This has already been indicated in the images, where the lens frames touch one another in parts. In accordance with one or more embodiments, the adjacent optical elements, e.g. on a ring, are thereby spaced apart from one another by less than 2-times. Alternatively, in accordance with one or more embodiments, the elements may be spaced apart from one another by less than 1-times, or less than 0.5-times, or less than 0.2-times, or less than 0.1-times the diameter (or the longest diagonal in the case of non-circular shapes) of the respective optical element, wherein the place holders must also be treated as optical elements.

The presented solutions are also suitable to replace optical elements in an optical path, wherein the optical elements does not necessarily have to encompass an optical refractive power. The arrangements according to FIG. 3 can thereby be described by means of an auxiliary construction, e.g.: When considering a sectional plane, which is perpendicular to the axis of rotation and which also intersects the two optical axes of the optical path at the entry and at the exit of the arrangement, the perpendicular projection of the intersecting point of the axis of rotation with the sectional plane on the straight line through the two intersecting points of the optical axes with the sectional plane lies precisely between these two intersecting points of the optical axes with the sectional plane.

It is furthermore important that the reproducibility of the imaging ratios in the case of the solutions according to one or more embodiments of the invention is considerably better than and/or similar as in the case of the conventional optical arrangements for continuously varying an imaging ratio and/or a refractive power, e.g. according to FIG. 2. It can even be better, by several orders of magnitude. This can be very important in the case of applications, where the imaging ratios are switched over or back and forth more often, e.g. between two imaging ratios.

It is furthermore worth mentioning that the deflection of the optical path in the arrangements according to one or more embodiments of the invention can have a particularly space-saving effect when DOEs are involved, in particular in response to good light conditions, and the presented arrangements can furthermore be miniaturized by several (several ten) percent. Reference is made herewith to the deflection solutions from patent application DE 195 25 520 A1, the full scope of the disclosure content of which is adopted by reference.

Furthermore, in the event that an element having a variable refractive power in an optical arrangement for varying an imaging ratio and/or a refractive power is used, it can also take over further functions in addition to the autofocus and anti jitter function:

1. correction or residual correction of the imaging errors, in particular of the optical elements, which can be pivoted into and/or pivoted to and/or switched into and/or switched to or
2. continuously varying an imaging ratio or a refractive power when the optical element having a variable refractive power itself and/or one of the other optical elements, such as lenses and/or mirrors, etc., e.g., is or are moved along the optical axis, respectively.

It must furthermore be noted that the term "lens" in this application has been used in terms of "optical element" (and vice versa) on many occasions.

Advantageously, one or more embodiments of the present invention may be employed with electronic or other devices. For example, embodiments optical arrangements as disclosed here may be used in, for example, a cellular phone with a camera, a camera, a video camera, a webcam, a microscope, an endoscope, a slit lamp microscope, a barcode reader, a bio scanner, a vehicle with or without a driver assistance system, a magnifying glass or microscope worn on the head, or a stereo alternative of these instruments.

While the disclosure has been presented with respect to a limited number of embodiments, those skilled in the art, having benefit of this disclosure, will appreciate that other embodiments may be devised which do not depart from the scope of the present disclosure. Accordingly, the scope of the invention should be limited only by the attached claims.

What is claimed:

1. An optical arrangement for varying an imaging ratio comprising:
at least one optical path with an optical axis, further comprising at least two optical elements, which can be pivoted into or switched into the optical path,
    wherein each of the said optical elements encompasses a refractive power and an optical axis,
    wherein each of the optical axes of the optical elements can be made substantially congruent with the optical axis of the arrangement, and
    wherein the optical path between the optical elements, which can be pivoted into or switched into the optical path, undergoes at least one change in direction.

2. The optical arrangement according to claim 1, wherein the variation of an imaging ratio takes place in at least one of discrete steps or continuously or virtually continuously.

3. The optical arrangement according to claim 2, wherein the optical elements, which can be pivoted into or switched into the optical path, are pivoted into or switched into, respectively, in pairs.

4. The optical arrangement according to claim 3, wherein the optical elements, which can be pivoted into or switched into the optical path in pairs, in each case encompass a defined imaging ratio in pairs.

5. The optical arrangement according to claim 4, wherein the arrangement includes at least one part for varying an imaging ratio in discrete steps and another part for continuously varying an imaging ratio.

6. The optical arrangement according to claim 5, wherein the arrangement includes at least one optical elements having a variable refractive power.

7. The optical arrangement according to claim 6, wherein the at least one optical element having a variable refractive power is a lens having a variable refractive power or a mirror having a variable refractive power.

8. The optical arrangement according to claim 6, wherein the optical elements having a variable refractive power can be controlled such that an intermediate imaging ratio values are supplied continuously to the discrete values of the arrangement.

9. The optical arrangement according to claim 6, wherein the optical elements having a variable refractive power themselves form an optical arrangement for continuously varying an imaging ratio comprising an imaging ratio dynamic M, wherein:
    $M => M_{ij}$ for all $M_{ij} => 1$ and $M => 1/M_{ij}$ for all $M_{ij} =< 1$, wherein $V_i = M_{i,j} * V_j$ and $V_i$, $V_j$ are proximate discrete imaging ratios of the arrangement.

10. The optical arrangement according to claim 6, wherein the optical elements having a variable refractive power themselves form an optical arrangement for continuously varying an imaging ratio comprising an imaging ratio dynamic M in the range 1.1 to 2.5.

11. The arrangement according to claim 7, wherein at least one of the lenses having a variable refractive power is used in the context of an anti jitter device and/or an autofocus device.

12. The optical arrangement according to claim 4, wherein the optical axes of the optical elements, which can be pivoted into the optical path, run substantially parallel to the axis of a rotatable part of rotation of the arrangement.

13. The optical arrangement according to claim 12, wherein the optical arrangement includes at least two rotary devices, which are at least partly independent of one another, comprising optical elements, which can be pivoted into the optical path.

14. The optical arrangement according to claim 4, wherein the optical axes of the optical elements, which can be pivoted into the optical path, run substantially perpendicular to the axis of rotation of a rotatable part of the arrangement.

15. An optical instrument comprising the optical arrangement according to claim 1, further comprising an arrangement for continuously varying an imaging ratio.

16. The optical instrument according to claim 15, wherein the arrangement for continuously varying an imaging ratio has an imaging ratio dynamic M, wherein:
    $M >= M_{ij}$ for all $M_{ij} >= 1$ and $M >= 1/M_{ij}$ for all $M_{ij} <= 1$, wherein $V_i = M_{i,j} * V_j$ and $V_i$, $V_j$ are proximate discrete imaging ratios of the other arrangement for varying an imaging ratio in discrete steps alone.

17. The optical instrument according to claim 15, wherein the arrangement for continuously varying an imaging ratio encompasses an imaging ratio dynamic M in the range 1.1 to 2.5.

18. The optical instrument according to claim 15, wherein the time for the change between the proximate discrete positions of the imaging ratios $V_i$ and $V_j$ of the optical arrangement for varying an imaging ratio in discrete steps and the time for completely detuning the arrangement for continuously varying an imaging ratio by substantially $M' = M_{ij}$ differ by less than a factor 10.

19. The optical instrument according to claim 15, wherein the time for the change between two non-proximate discrete positions the imaging ratios $V_j$ and $V_k$ of the optical arrangement for varying an imaging ratio and/or a refractive power in discrete steps is shorter than two-times the time for the change between two proximate discrete positions of the imaging ratios $V_i$ and $V_j$.

20. The optical instrument according to claim 15, wherein the optical radiation is coupled into this arrangement and/or out of this arrangement via at least one deflecting device.

21. The optical instrument including an arrangement according to claim 15, wherein the optical instrument generates, displays, superimposes or stores a digitally enlarged or reduced image or image sequence of the object, which is imaged by the arrangement, and/or stores parameters for such an image or image sequence or can generate, display, superimpose and store them, respectively.

22. The optical instrument according to claim 21, wherein the optical instrument displays, superimposes or stores a digitally enlarged or reduced image sequence of the object, which is imaged by the arrangement, and/or stores parameters for such an image sequence, wherein the image sequence includes images comprising different stages of the digital enlargement or reduction.

23. The optical instrument according to claim 22, wherein the optical instrument continuously varies the digital enlargement or reducing chronologically.

24. An optical arrangement according to claim 1, wherein the distance of the adjacent optical elements, which can be pivoted into or switched into the optical path is less than 2-times the diameter or the longest diagonal of the respective optical element.

* * * * *